US010134524B2

(12) United States Patent
Yuasa

(10) Patent No.: US 10,134,524 B2
(45) Date of Patent: Nov. 20, 2018

(54) ELECTRIC POWER RECEIVING DEVICE AND ELECTRIC POWER TRANSMISSION DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 213 days.

(21) Appl. No.: 15/363,238

(22) Filed: Nov. 29, 2016

(65) Prior Publication Data

US 2017/0169942 A1    Jun. 15, 2017

(30) Foreign Application Priority Data

Dec. 9, 2015    (JP) .................. 2015-240506

(51) Int. Cl.

| H01F 38/14 | (2006.01) |
|---|---|
| H02J 50/12 | (2016.01) |
| H02J 7/02 | (2016.01) |
| B60L 11/18 | (2006.01) |
| H01F 27/24 | (2006.01) |
| H01F 27/28 | (2006.01) |
| H01F 27/36 | (2006.01) |

(52) U.S. Cl.
CPC ............ *H01F 38/14* (2013.01); *B60L 11/182* (2013.01); *H01F 27/24* (2013.01); *H01F 27/2804* (2013.01); *H01F 27/365* (2013.01); *H02J 7/025* (2013.01); *H02J 50/12* (2016.02)

(58) Field of Classification Search
CPC ....................................... H01F 38/14

USPC ........................................... 307/104
See application file for complete search history.

(56) References Cited

U.S. PATENT DOCUMENTS

| 2008/0129246 A1 | 6/2008 | Morita et al. |
|---|---|---|
| 2013/0127409 A1 | 5/2013 | Ichikawa |
| 2013/0193749 A1 | 8/2013 | Nakamura et al. |
| 2015/0008877 A1 | 1/2015 | Ichikawa et al. |

(Continued)

FOREIGN PATENT DOCUMENTS

| JP | 2008-120239 A | 5/2008 |
|---|---|---|
| JP | 2013-051285 A | 3/2013 |

(Continued)

OTHER PUBLICATIONS

Budhia M. et al., "Design and Optimisation of Magnetic Structures for Lumped Inductive Power Transfer Systems," Energy Conversion Congress and Exposition, 2009, pp. 2081-2088.

*Primary Examiner* — Joseph Chang
(74) *Attorney, Agent, or Firm* — Oliff PLC

(57) ABSTRACT

An electric power receiving device includes a ferrite, and a power receiving coil in which a hollow portion is formed. The power receiving coil is formed so as to surround a winding axis that extends in the thickness direction. When the power receiving coil and the ferrite are viewed from an observation position spaced apart from the power receiving coil in a direction in which the winding axis extends, notch portions are formed in an outer peripheral portion of the ferrite such that the notch portions overlap side portions of the coil. The width of each notch portion as measured in a circumferential direction of the power receiving coil increases in a direction away from the hollow portion of the power receiving coil.

8 Claims, 37 Drawing Sheets

(56) References Cited

U.S. PATENT DOCUMENTS

| | | | |
|---|---|---|---|
| 2015/0077053 A1* | 3/2015 | Stamenic | H02J 7/0042 320/109 |
| 2015/0325362 A1* | 11/2015 | Kumura | H01F 38/14 336/84 M |
| 2016/0355095 A1 | 12/2016 | Okamoto | |

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| WO | 2015/128942 A1 | 9/2015 |

* cited by examiner

ELECTRIC POWER RECEIVING DEVICE AND ELECTRIC POWER TRANSMISSION DEVICE

CROSS REFERENCE TO RELATED APPLICATIONS

The disclosure of Japanese Patent Application No. 2015-240506 filed on Dec. 9, 2015 including the specification, drawings and abstract is incorporated herein by reference in its entirety.

BACKGROUND

1. Technical Field

The disclosure relates to an electric power receiving device and an electric power transmission device.

2. Description of Related Art

Contactless electric power transmission systems that contactlessly or wirelessly transmit electric power from an electric power transmission device to an electric power receiving device have been proposed (see Japanese Patent Application Publications No. 2013-154815 (JP 2013-154815 A), No. 2013-146154 (JP 2013-146154 A), No. 2013-146148 (JP 2013-146148 A), No. 2013-110822 (JP 2013-110822 A), No. 2013-126327 (JP 2013-126327 A), and No. 2013-51285 (JP 2013-51285 A)).

For example, an electric power transmission device described in Japanese Patent Application Publication No. 2008-120239 (JP 2008-120239 A) includes a ferrite formed in rectangular shape, and a power transmission coil having an oval shape and disposed on a major surface of the ferrite.

The major surface of the ferrite includes a pair of long sides and a pair of short sides. Lateral-side protrusions that protrude upward are formed along the long sides, and a central protrusion that protrudes upward is also formed on a central portion of the major surface.

A hollow portion is defined in a central portion of the power transmission coil, and the outline of the power transmission coil has an oval shape in a plane as viewed from above. More specifically, an outer peripheral portion of the power transmission coil includes a pair of lateral side portions, and a pair of arcuate portions that connect corresponding end portions of the respective lateral side portions.

The central protrusion of the ferrite is inserted in the hollow portion of the power transmission coil, and the power transmission coil is located so as to surround the protrusion formed in the central portion of the ferrite. The power transmission coil surrounds the periphery of the central protrusion as the coil turns from one end to the other end, such that the distance from the central protrusion increases as the number of turns increases. An electric power receiving device is formed similarly to the electric power transmission device.

SUMMARY OF THE DISCLOSURE

When the electric power transmission device described in JP 2008-120239 A transmits electric power to the electric power receiving device, AC electric power is supplied to the power transmission coil. When AC current flows through the power transmission coil, magnetic flux is formed around the power transmission coil. The magnetic flux from the power transmission coil is emitted radially from the center of the power transmission coil and its vicinity.

Since the power transmission coil is formed in oval shape, the distance between the center of the power transmission coil and each lateral side portion is shorter than the distance between the center of the power transmission coil and each arcuate portion.

Therefore, a large proportion of the magnetic flux emitted from the center of the power transmission coil and its vicinity proceeds toward the lateral side portions of the power transmission coil, and then enters long-side portions of the ferrite. The magnetic flux incident upon the ferrite flows in the ferrite, and reaches the hollow portion of the power transmission coil. Thus, a large proportion of the magnetic flux flows so as to surround the lateral side portions of the power transmission coil. A part of magnetic flux directed toward the arcuate portions of the power transmission coil enters the ferrite on the outer side of the arcuate portions, and passes through the ferrite, to return to the winding axis and its vicinity again.

In the meantime, since the magnetic flux path directed to each arcuate portion is long, the radius of the magnetic path through which the magnetic flux directed to the arcuate portion passes (the distance from the power transmission coil) is likely to be large. As the radius of the magnetic path increases, the magnetic flux is more likely to get closer to a power receiving coil that is positioned to be opposed to the power transmission coil, and the magnetic flux is more likely to be interlinked with the power receiving coil. With the magnetic flux from the power transmission coil thus interlinked with the power receiving coil, the power receiving coil receives electric power.

Thus, in the power transmission device described in JP 2008-120239 A, a relatively large amount of magnetic flux flows around the power transmission coil to be self-closed, while a relatively small amount of magnetic flux is interlinked with the power receiving coil, thus causing a problem of reduction of the coupling coefficient.

The power receiving device is configured similarly to the power transmission device. Therefore, when induction current flows in the power receiving coil, a large proportion of magnetic flux formed by the induction current flows around lateral side portions of the power receiving coil to be self-closed, resulting in a problem of reduction of the coupling coefficient.

While it may be considered to increase the size of the ferrite, in order to simply increase the coupling coefficient, the ferrite material is expensive, and the amount of ferrite used needs to be reduced, from the viewpoint of the manufacturing cost. However, simply reducing the ferrite amount may result in reduction of the coupling coefficient.

This disclosure provides an electric power receiving device and an electric power transmission device each having a coil including arcuate portions and side portions, wherein it is possible to provide a high coupling coefficient, while reducing the amount of ferrite needed.

An electric power receiving device according to one aspect of this disclosure includes a ferrite, and a power receiving coil. The ferrite includes a first major surface and a second major surface arranged in a thickness direction, and is in the form of a plate. The power receiving coil is disposed on the first major surface. The power receiving coil surrounds a winding axis that extends in the thickness direction. The power receiving coil has a hollow portion when the power receiving coil is viewed from an observation position spaced apart from the power receiving coil in a direction in which the winding axis extends. An outer peripheral portion of the power receiving coil includes a plurality of bent portions, and side portions that connect adjacent ones of the bent portions. The ferrite includes corner portions that protrude outwardly of the bent portions of the power receiving coil, when the ferrite is viewed from the observation position. Notch portions are provided in an outer peripheral portion of the ferrite such that the notch portions overlap the side portions, respectively, when the power receiving coil and the ferrite are viewed from the observation position. The width of each of the notch portions as measured in a circumferential direction of the power receiving coil increases in a direction away from the hollow portion of the power receiving coil.

In the electric power receiving device as described above, the notch portions are provided in the ferrite, so that the amount of ferrite needed can be reduced, for reduction of the manufacturing cost. The following description is about ensuring a sufficient coupling coefficient while reducing the manufacturing cost as described above.

In the electric power receiving device as described above, when the power receiving coil receives electric power from the power transmission coil, current flows in the power receiving coil, and the current forms magnetic flux around the power receiving coil. In the outer peripheral portion of the ferrite, the notch portions are provided in portions that overlap the side portions of the power receiving coil. Therefore, the magnetic flux directed from the winding axis and its vicinity toward each side portion of the power receiving coil passes the outer side of the side portion, and reaches the ferrite after passing through the notch portion. On the other hand, the magnetic flux directed from the winding axis and its vicinity toward each bent portion of the power receiving coil reaches the ferrite, immediately after passing the outer side of the bent portion of the power receiving coil, since each corner portion of the ferrite extends outwardly of the power receiving coil.

Therefore, the length of a magnetic path directed toward the side portion, in which the magnetic flux travels through air, is likely to be larger than that of a magnetic path directed toward the bent portion, in which the magnetic flux travels through air, and the magnetic resistance is likely to be higher in the magnetic path directed toward the side portion.

Therefore, the magnetic flux directed toward the side portion is reduced, and the magnetic flux thus reduced starts traveling through the corner portion of the power receiving coil. As a result, the magnetic flux directed from the winding axis and its vicinity toward the bent portion of the power receiving coil is increased. If the amount of magnetic flux traveling along the magnetic path is increased, the magnetic flux that is emitted from the winding axis and its vicinity, passes positions remote from the power receiving coil, and enters the corner portion, is increased.

Since the distance between the bent portion of the power receiving coil and the winding axis is long, the radius of the above-indicated magnetic path (distance from the power receiving coil) is likely to be large. Since the magnetic path gets closer to the power transmission coil as the distance from the power receiving coil increases, the magnetic flux interlinked with the power transmission coil increases, and the coupling coefficient increases, as the amount of magnetic flux flowing toward the bent portion of the power receiving coil increases.

The magnetic flux interlinked with the power transmission coil returns to the corner portion of the ferrite of the power receiving device, and the magnetic flux incident upon the corner portion of the ferrite flows toward the hollow portion of the power receiving coil. At this time, the magnetic flux passes through portions other than the notch portions. Since the width of the notch portion decreases toward the hollow portion, the width of flow channel through which the magnetic flux can flow is less likely or unlikely to be reduced. Thus, the path through which magnetic flux interlinked with the power transmission coil and the power receiving coil flows has a sufficiently large width, and a high coupling coefficient can be ensured.

In the electric power receiving device as described above, each of the notch portions may overlap a middle part of a corresponding one of the side portions of the power receiving coil, when the ferrite and the power receiving coil are viewed from the observation position.

In the electric power receiving device as described above, the distance between the middle of each side portion and the winding axis is shortest, among distances between the outer periphery of the power receiving coil and the winding axis. If the notch portions are not provided, the amount of magnetic flux directed from the winding axis side toward the middle part of the side portion would be large, and the magnetic flux interlinked with the power transmission coil would be reduced. Thus, the notch portion is formed in the middle of the side portion, so that the amount of magnetic flux directed to the middle of the side portion can be reduced. As a result, the amount of magnetic flux directed to the corner portions of the ferrite can be increased, and the amount of magnetic flux interlinked with the power transmission coil can also be increased.

In the electric power receiving device as described above, the ferrite may have a hole portion. The hole portion of the ferrite may be located within the hollow portion of the power receiving coil, when the ferrite and the power receiving coil are viewed from the observation position. A periphery of the hole portion may include a first portion close to the middle part, and a second portion close to the corner portion. A distance between a periphery of the hollow portion and the second portion may be larger than a distance between the periphery of the hollow portion and the first portion.

In the electric power receiving device as described above, the second portion of the periphery of the hole portion of the ferrite is located closer to the winding axis than the first portion. Therefore, the area of the ferrite exposed through the hollow portion of the coil is larger on the second portion side, than the area exposed on the first portion side. The magnetic flux directed from the winding axis and its vicinity toward each corner portion of the ferrite passes through the second portion, in which a large area of the ferrite is exposed. As a result, even if the magnetic flux directed from the winding axis and its vicinity toward the corner portion is increased, magnetic saturation is less likely or unlikely to occur. Consequently, the amount of magnetic flux interlinked with the power transmission coil can be increased.

In the electric power receiving device as described above, the ferrite may have a first gap portion that extends from the hole portion and reaches each of the corner portions, and a second gap portion that extends from the hole portion and reaches each of the notch portions. The ferrite may include a plurality of ferrite pieces that are arranged at intervals in a circumferential direction of the power receiving coil.

Each of the ferrite pieces may include a radially outer side that is located in an outer peripheral portion of the corner portion, a radially inner side that forms a part of the periphery of the hole portion, an oblique side that connects the radially outer side and the radially inner side, a notch side that is connected to the radially outer side, and forms a part of a periphery of the notch portion, and a short side that connects the radially inner side and the notch side. The outer peripheral portion of each of the corner portions may be formed by the radially outer sides of two of the ferrite pieces that are arranged such that the oblique sides are opposed to each other with the first gap portion interposed therebetween. The periphery of each of the notch portions may be formed by the notch sides of two of the ferrite pieces that are arranged such that the short sides are opposed to each other with the second gap portion interposed therebetween.

In the electric power receiving device as described above, adjacent ferrite pieces have the same shape, and therefore, the respective ferrite pieces can be formed with a single mold. As a result, the manufacturing cost can be significantly reduced.

According to this disclosure, in the electric power receiving device and the electric power transmission device each having a coil including arcuate portions and side portions, it is possible to provide a high coupling coefficient, while reducing the amount of ferrite needed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
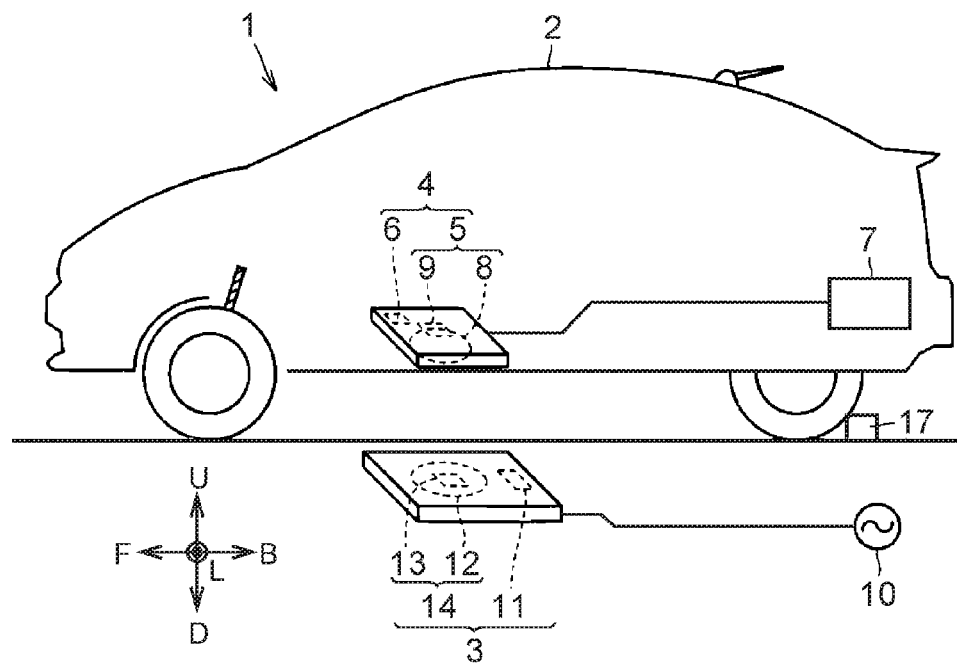
FIG. 1 is a schematic view showing a contactless charging system 1.
Figure 2:
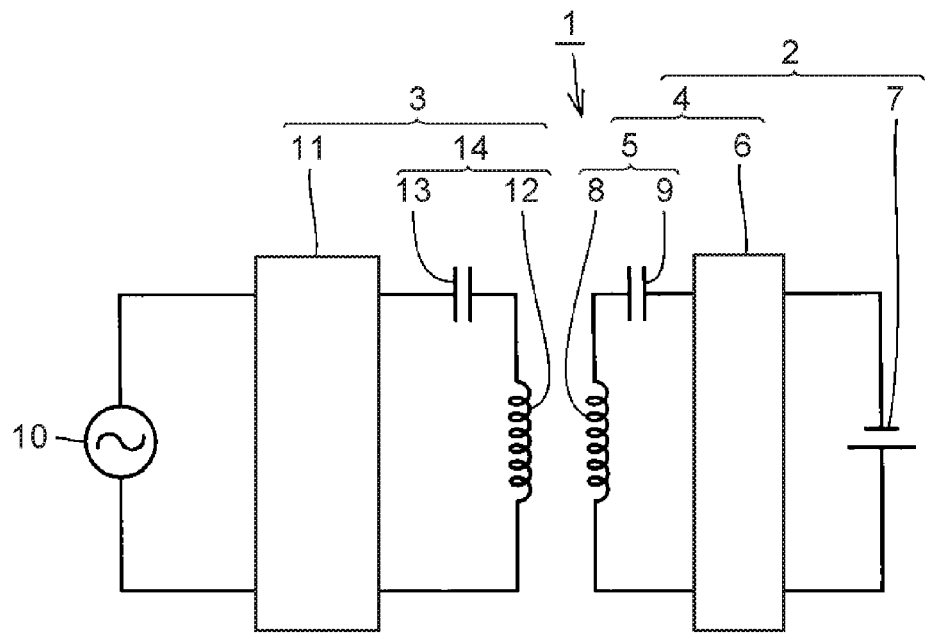
FIG. 2 is a circuit diagram schematically showing the contactless charging system 1.

Initially, a contactless charging system 1 according to a first embodiment will be described. FIG. 1 is a schematic view showing the contactless charging system 1. FIG. 2 is a circuit diagram schematically showing the contactless charging system 1. The contactless charging system 1 has a vehicle 2 including an electric power receiving device 4 and a battery 7, and an electric power transmission device 3 connected to a power supply 10.

The electric power receiving device 4 includes a resonator 5, and a rectifier 6 that converts AC power received by the resonator 5 into DC power, and supplies the DC power to the battery 7.

The resonator 5 is an LC resonator, and includes a power receiving coil 8 and a capacitor 9 which are connected to the rectifier 6. The Q value of the resonator 5 is equal to or larger than 100.

The electric power transmission device 3 includes a resonator 14, and a converter 11 connected to the power supply 10. The converter 11 adjusts the frequency and voltage of AC power supplied from the power supply 10, and supplies the resulting AC power to the resonator 14. The resonator 14 is an LC resonator, and includes a power transmission coil 12 and a capacitor 13 which are connected to the converter 11. The Q value of the resonator 14 is also equal to or larger than 100. The resonance frequency of the resonator 14 is substantially equal to the resonance frequency of the resonator 5.

In FIG. 1, "U" denotes upward U, and "D" denotes downward D. "F" denotes forward F, and B denotes backward B. "L" denotes leftward L. In FIG. 2 and subsequent figures, "R" denotes rightward R.

Figure 3:
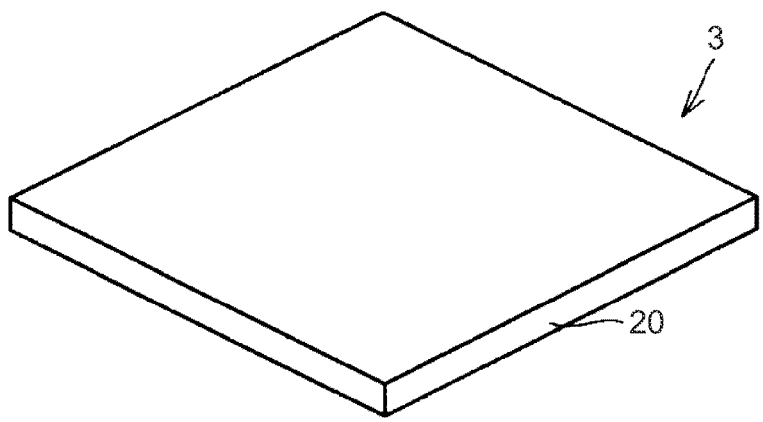
FIG. 3 is a perspective view showing an electric power transmission device 3.
Figure 4:
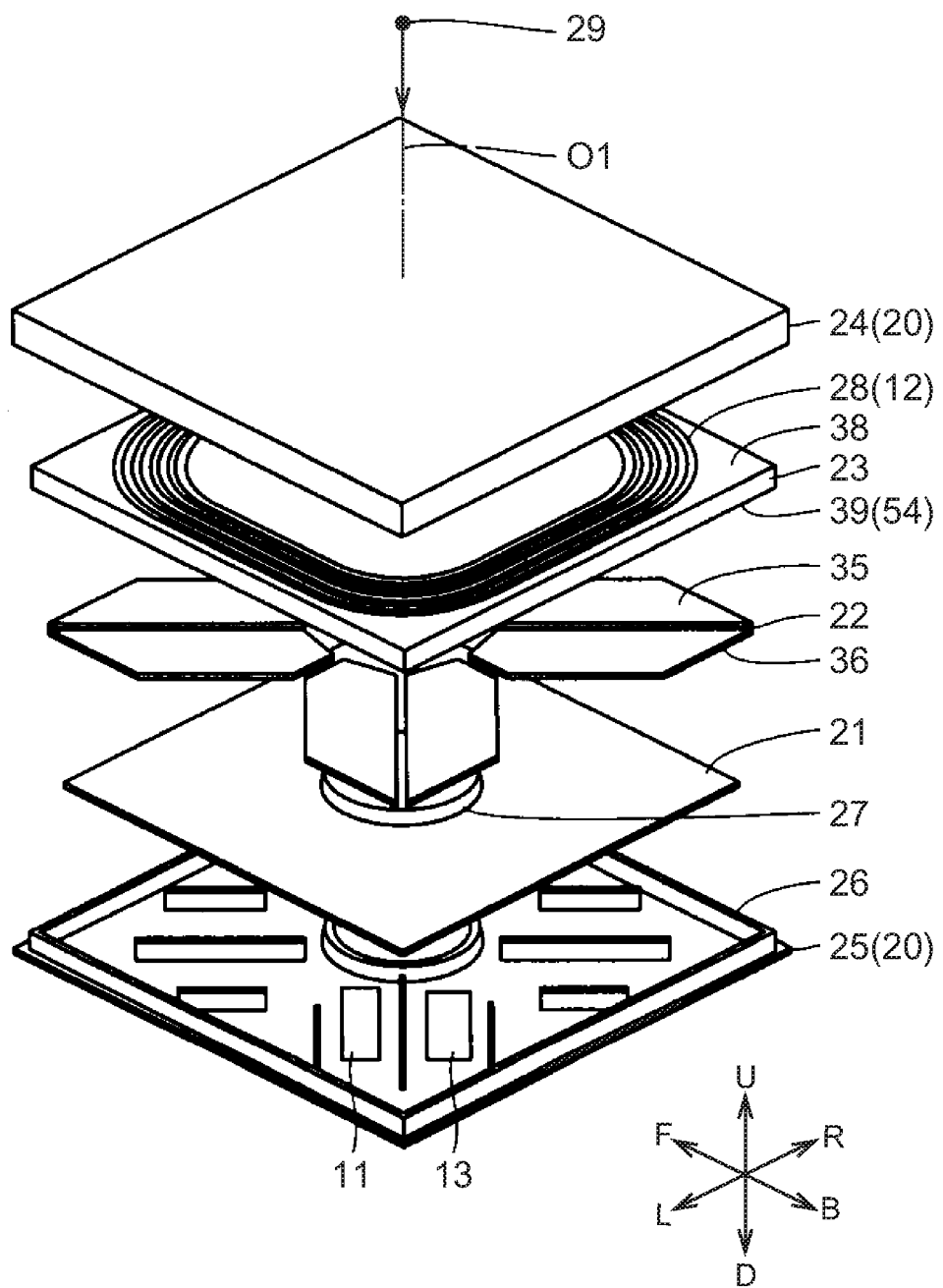
FIG. 4 is an exploded perspective view showing the power transmission device 3.

Next, the configuration of the electric power transmission device 3 will be described, with reference to FIG. 3 through FIG. 12. FIG. 3 is a perspective view showing the power transmission device 3, and FIG. 4 is an exploded perspective view showing the power transmission device 3. In FIG. 4, the power transmission device 3 includes a case 20, a support plate 21 housed in the case 20, a ferrite 22 and a bobbin 23.

The case 20 includes a base plate 25 made of metal, and a resin lid 24 disposed so as to cover the upper surface of the base plate 25.

A plurality of support walls 26 are provided on the upper surface of the base plate 25, and the support plate 21 made of metal is disposed on the support walls 26.

The support walls 26 cooperate with the support plate 21 and the base plate 25 to define a space between the support plate 21 and the base plate 25, and the converter 11 and the capacitor 13 are disposed between the support plate 21 and the base plate 25.

The support plate 21 is formed of a metal material, in the form of a flat plate. A central portion of the support plate 21 includes a protrusion 27 that protrudes upward.

The ferrite 22 is disposed on the upper surface of the support plate 21, such that it surrounds the protrusion 27. The ferrite 22 is in the form of a plate, and includes an upper surface (first major surface) 35 and a lower surface (second major surface) 36 arranged in the thickness direction of the ferrite 22. The bobbin 23 is disposed on the upper surface 35.

The bobbin 23 is formed of an insulating material, such as a resin, and is in the form of a plate. An upper surface 38 of the bobbin 23 has a coil groove 28 that extends in a spiral fashion, and the power transmission coil 12 is received in the coil groove 28.

The resin lid 24 is formed of a resin material, through which magnetic flux formed around the power transmission coil 12 can pass.

Figure 5:
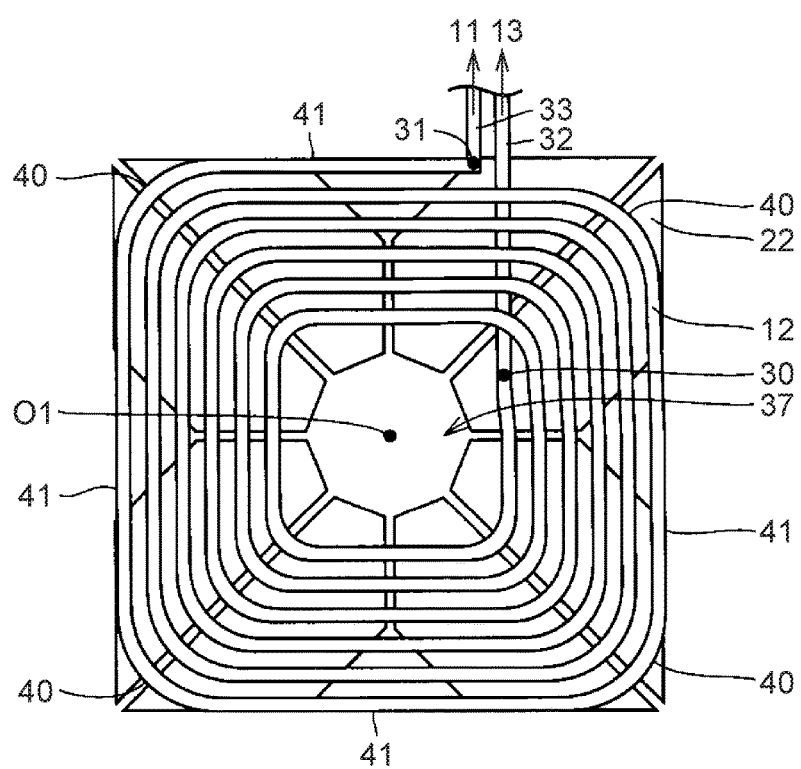
FIG. 5 is a plan view of a power transmission coil 12 and a ferrite 22 when viewed from an observation position 29 shown in FIG. 4.

FIG. 5 is a plan view of the power transmission coil 12 and the ferrite 22 as viewed from an observation position 29 shown in FIG. 4. As shown in FIG. 5, the power transmission coil 12 is formed so as to surround a winding axis O1. The winding axis O1 extends in the thickness direction of the ferrite 22 in the form of a plate, and the winding axis O1 extends in the vertical direction, in the example shown in FIG. 5. The observation position 29 shown in FIG. 4 is located apart from the power transmission coil 12 in the direction in which the winding axis O1 extends. In the first embodiment, the winding axis O1 is located at the center of an outer periphery of the power transmission coil 12. Meanwhile, it suffices that the power transmission coil 12 is formed so as to surround an axis that passes through a hollow portion 37, and the winding axis O1 is not necessarily required to coincide with the center of the outer periphery of the power transmission coil 12.

The power transmission coil 12 includes a radially inner end 30 and a radially outer end 31. A lead wire 32 connected to the capacitor 13 is connected to the radially inner end 30, and a lead wire 33 connected to the converter 11 is connected to the radially outer end 31.

The power transmission coil 12 is formed such that the distance from the winding axis O1 increases as the number of turns of the coil increases from the radially inner end 30 toward the radially outer end 31.

The outer periphery of the power transmission coil 12 includes a plurality of bent portions 40, and side portions 41 that connect adjacent ones of the bent portions 40.

Thus, the power transmission coil 12 is a polygonal winding-type coil with corner portions formed in curved shape, and the hollow portion 37 is defined in a central portion of the power transmission coil 12.

Figure 6:
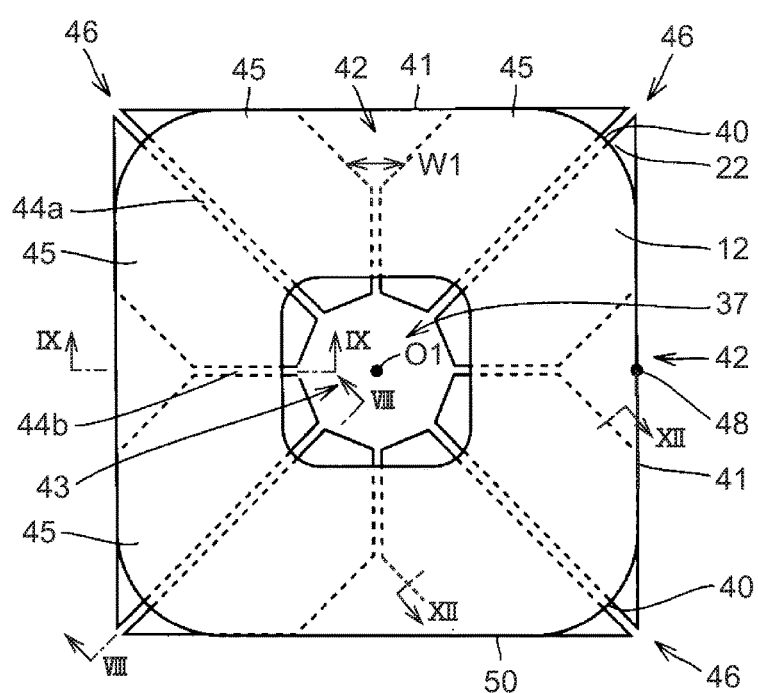
FIG. 6 is a plan view showing the power transmission coil 12 in a simplified form and the ferrite 22.

FIG. 6 is a plan view showing the power transmission coil 12 and the ferrite 22 in simplified forms. As shown in FIG. 6, the outer periphery of the ferrite 22 has a generally polygonal shape, and the ferrite 22 includes a plurality of corner portions 46. The corner portions 46 extend outwardly of the bent portions 40 of the power transmission coil 12.

A plurality of notch portions 42 are defined in the outer peripheral portion of the ferrite 22. The notch portions 42 are located between the corner portions 46 of the ferrite 22. The notch portions 42 are defined such that the notch portions 42 and the power transmission coil 12 overlap each other, when the power transmission coil 12 and the ferrite 22 are viewed from the observation position 29. The notch portions 42 are located so as to overlap middle portions between the adjacent bent portions 40. In the example shown in FIG. 6, the notch portions 42 are located so as to overlap middle portions 48 of the side portions 41. Thus, since the ferrite 22 is provided with the plurality of notch portions 42, the required amount of the ferrite material is smaller, as compared with a ferrite that is not provided with the notch portions 42. Consequently, the manufacturing cost of the ferrite 22 is reduced.

The width W1 of each notch portion 42 as measured in the circumferential direction of the power transmission coil 12 increases as the distance from the hollow portion 37 of the power transmission coil 12 increases.

A hole portion 43 is defined in a central portion of the ferrite 22, and first gap portions 44a and second gap portions 44b extend radially from the hole portion 43. The hole portion 43 is located within the hollow portion 37.

The first gap portions 44a and the second gap portions 44 extend radially from the winding axis O1 as the center. The first gap portions 44a reaches the corresponding corner portions 46, and the second gap portions 44b are connected to the corresponding notch portions 42.

The ferrite 22 includes a plurality of ferrite pieces 45 arranged at intervals in the circumferential direction of the power transmission coil 12. Each of the ferrite pieces 45 is formed in an elongate shape such that it reaches the interior of the hollow portion 37 of the power transmission coil 12, from the outer periphery of the power transmission coil 12.

With adjacent ones of the ferrite pieces 45 thus arranged at intervals in the circumferential direction of the power transmission coil 12, the first gap portions 44a and the second gap portions 44b are defined.

Figure 7:
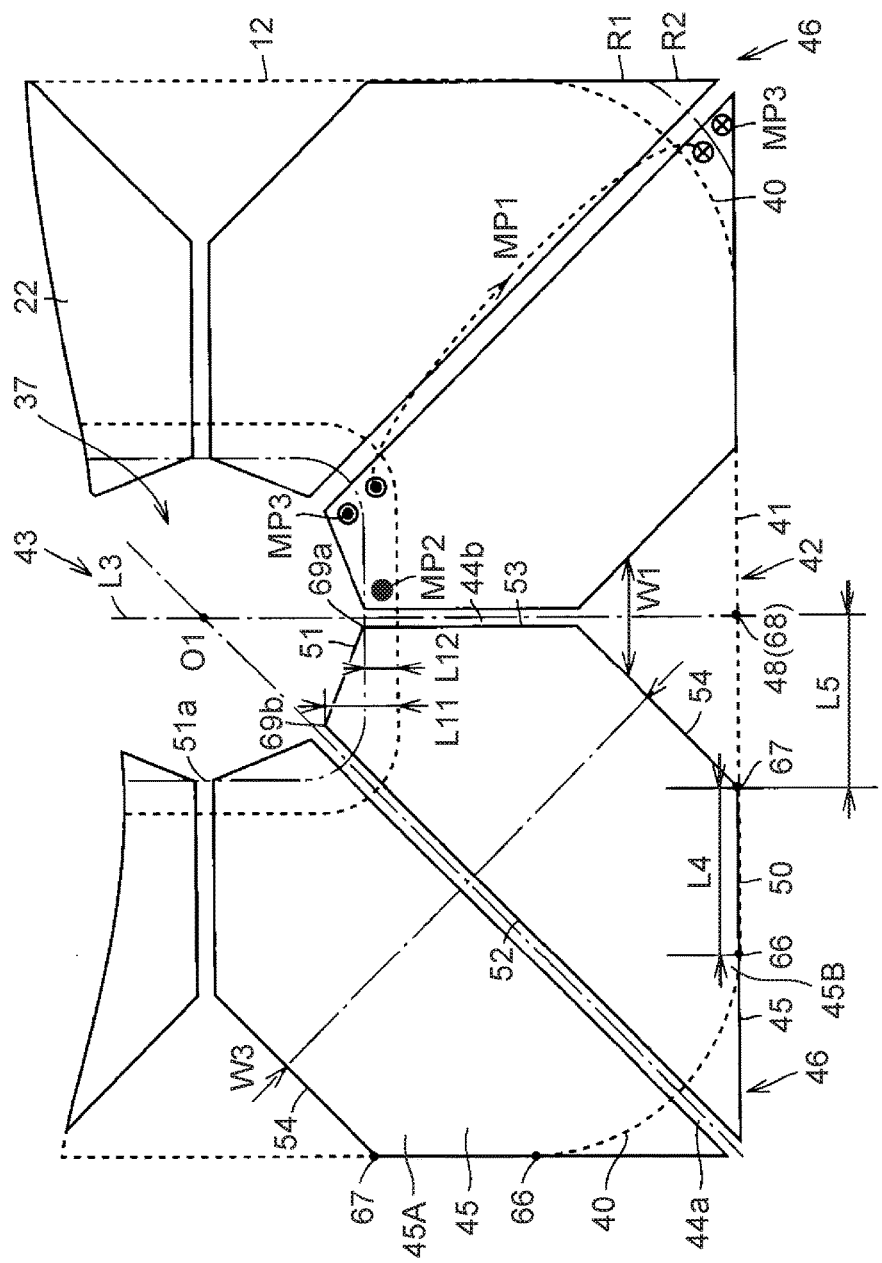
FIG. 7 is a plan view showing ferrite pieces 45.

FIG. 7 is a plan view showing the ferrite pieces 45. As shown in FIG. 7, an outer periphery of each of the ferrite pieces 45 includes a radially outer side 50, a radially inner side 51, an oblique side 52, a short side 53, and a notch side 54.

The radially outer side 50 is located in the outer periphery of the ferrite 22. The radially inner side 51 forms a part of a periphery of the hole portion 43. The oblique side 52 connects one end of the radially outer side 50 and one end of the radially inner side 51. The notch side 54 forms a part of the periphery of the corresponding notch portion 42, and one end of the notch side 54 is connected to the other end of the radially outer side 50. The short side 53 connects the other end of the notch side 54 and the other end of the radially inner side 51.

Each of the first gap portions 44a is defined by the oblique sides 52 of adjacent ones of the ferrite pieces 45, and the oblique sides 52 are parallel to a virtual line that extends from the winding axis O1 toward the corresponding corner portion 46. Each of the second gap portions 44b is defined by the short sides 53 of adjacent ones of the ferrite pieces 45, and the short sides 53 are parallel to a virtual line that extends from the winding axis O1 toward the middle portion 48 of the corresponding side portion 41.

Each of the corner portions 46 is defined by the radially outer sides 50 of the ferrite pieces 45 located adjacent to each other with the first gap portion 44a interposed therebetween, and each of the notch portions 42 is defined by the notch sides 54 of the ferrite pieces 45 located adjacent to each other with the second gap portion 44b interposed therebetween.

Also, the hole portion 43 is defined by the radially inner sides 51 of the ferrite pieces 45 arranged in the circumferential direction of the power transmission coil 12.

In each of the ferrite pieces 45, a corner portion 69a is formed by the radially inner side 51 and the short side 53, and a corner portion 69b is formed by the radially inner side 51 and the oblique side 52. In the periphery of the hole portion 43, the corner portions 69a is located closest to the corresponding middle portion 48, and the corner portion 69b is located closest to the corresponding corner portion 46.

In the example shown in FIG. 7, distance L11 is the shortest distance between the corner portion 69b and the periphery of the hollow portion 37, and distance L12 is the shortest distance between the corner portion 69a and the periphery of the hollow portion 37.

The shortest distance between the radially inner side 51 and the hollow portion 37 increases from the corner portion 69a toward the corner portion 69b.

As indicated by the two-dot chain line in FIG. 7, a virtual line that makes the distance between the periphery of the hole portion 43 and the periphery of the hollow portion 37 constant (distance L12) and passes the corner portions 69a is denoted as radially inner side 51a. Portions of the ferrite 22 which are located at and around the corner portions 69b are located closer to the winding axis O1 than the radially inner sides 51a indicated by the two-dot chain line.

The outer periphery of the power transmission coil 12 includes the bent portions 40, and the side portions 41 that are connected to the bent portions 40 and extend in the form of straight lines, and inflection points 66 are located at boundaries between the bent portions 40 and the side portions 41.

Here, a virtual line that passes the winding axis O1 and intersects at right angles with one of the side portions 41 is denoted as straight line L3, and the intersection point between the straight line L3 and the side portion 41 is denoted as intersection point 68. Also, a corner portion formed by one of the notch sides 54 and the corresponding radially outer side 50 is denoted as corner portion 67.

Where the distance between the inflection point 66 and the corner portion 67 is denoted as distance L4, and the distance between the intersection point 68 and the corner portion 67 is denoted as distance L5, the distance L5 is equal to or smaller than the distance L4. In the example shown in FIG. 7, the notch side 54 is parallel to the oblique side 52.

The radially outer side 50 extends straight, on one side of the inflection point 66 closer to the distal end of the corner portion 46, as well as on the other side, whereas the bent portion 40 of the power transmission coil 12 is curved. Therefore, the corner portion 46 extends outwardly of the power transmission coil 12.

Figure 8:
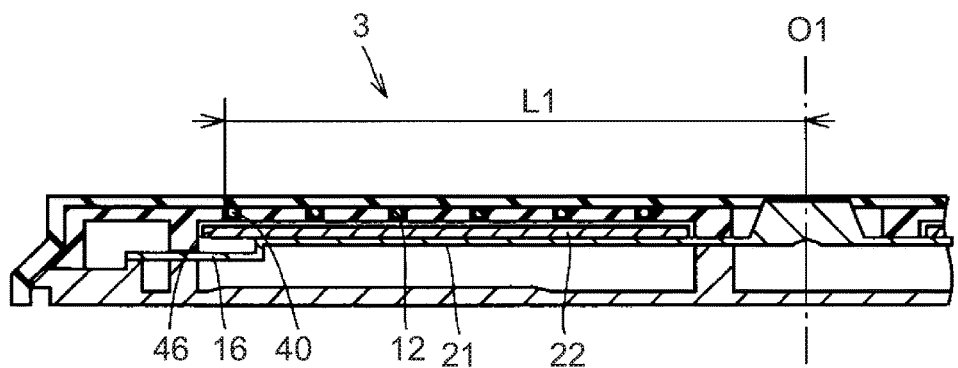
FIG. 8 is a cross-sectional view of the power transmission device 3 as viewed in a cross section taken along line VIII-VIII shown in FIG. 6.

FIG. 8 is a cross-sectional view of the electric power transmission device 3 as viewed in a cross section taken along line VIII-VIII shown in FIG. 6. More specifically, FIG. 8 is a cross-sectional view of the power transmission device 3 as viewed in a cross section that extends from the winding axis O1 through the first gap portion 44a, and also through the corner portion 46.

Figure 9:
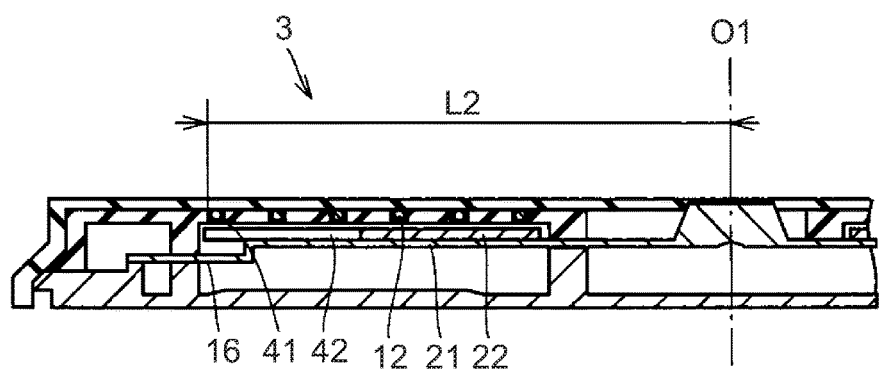
FIG. 9 is a cross-sectional view of the power transmission device 3 as viewed in a cross section that extends from a winding axis O1 and passes a gap portion 44b and a notch portion 42.

FIG. 9 is a cross-sectional view taken along line IX-IX shown in FIG. 6. More specifically, FIG. 9 is a cross-sectional view of the power transmission device 3 as viewed in a cross section that extends from the winding axis O1 through the second gap portion 44b and the notch portion 42.

Where the distance from the winding axis O1 to the bent portion 40 of the power transmission coil 12 is denoted as distance L1 in FIG. 8, and the distance from the winding axis O1 to the side portion 41 of the power transmission coil 12 is denoted as distance L2 in FIG. 9, the distance L1 is longer than the distance L2. Thus, there is a difference between the distance L1 and the distance L2, since the outline of the power transmission coil 12 has a polygonal shape.

As shown in FIG. 8, an outer peripheral portion of the support plate 21 is provided with a stepped portion 16 that is spaced apart from the lower surface of the ferrite 22, such that the stepped portion 16 extends over the entire circumference of the outer peripheral portion. Therefore, the lower surface of the ferrite 22 is exposed from the support plate 21, along the outer periphery of the ferrite 22.

Figure 10:
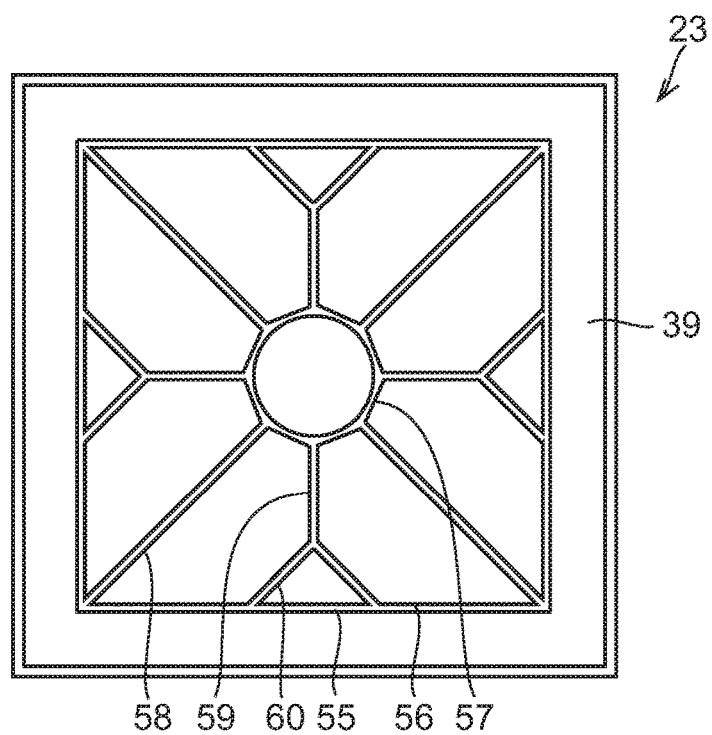
FIG. 10 is a plan view showing a lower surface 39 of a bobbin 23.

FIG. 10 is a plan view showing a lower surface 39 of the bobbin 23. As shown in FIG. 10, walls 55 that surround the periphery of each ferrite piece 45 shown in FIG. 6 are formed on the lower surface 39 of the bobbin 23.

The walls 55 include an outer frame wall 56, radially inner wall 57, oblique side walls 58, short side walls 59, and notch walls 60. When the bobbin 23 is placed on the ferrite 22, the outer frame wall 56 supports the radially outer sides 50 of the ferrite pieces 45 shown in FIG. 7. The radially inner wall 57 supports each radially inner side 51. The oblique side walls 58 are inserted in the first gap portions 44a, and support the oblique sides 52 of the ferrite pieces 45.

The short side walls 59 are inserted in the second gap portions 44b, and support the short sides 53 of the ferrite pieces 45. Further, the notch walls 60 support the notch sides 54 of the ferrite pieces 45.

Figure 11:
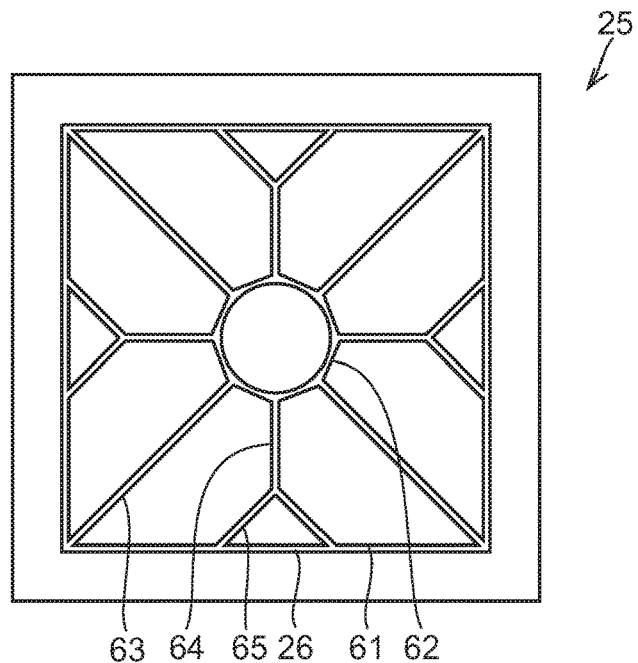
FIG. 11 is a plan view showing an upper surface of a base plate 25.

FIG. 11 is a plan view showing the upper surface of the base plate 25. As shown in FIG. 11, support walls 26 are formed on the upper surface of the base plate 25.

The support walls 26 include an outer frame wall 61, radially inner wall 62, oblique side walls 63, short side walls 64, and notch walls 65.

The outer frame wall 61 is located below the outer frame wall 56 shown in FIG. 10. Similarly, the radially inner wall 62, oblique side walls 63, short side walls 64, and notch walls 65 are located below the radially inner wall 57, oblique side walls 58, short side walls 59, and notch walls 60, respectively.

Figure 12:
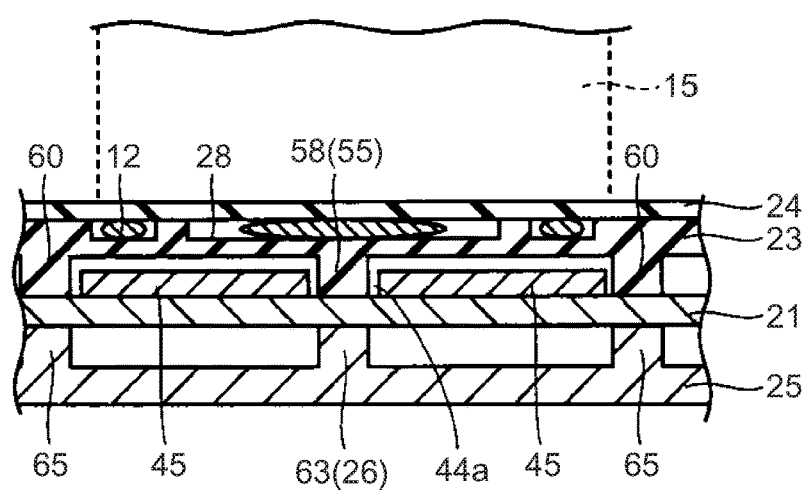
FIG. 12 is a cross-sectional view of the power transmission device 3 as viewed in a cross section taken along line XII-XII shown in FIG. 6.

FIG. 12 is a cross-sectional view of the electric power transmission device 3 as viewed in a cross section taken along line XII-XII shown in FIG. 6. As shown in FIG. 12, the walls 55 are formed on the lower surface of the bobbin 23, and the coil groove 28 is formed in the upper surface of the bobbin 23. The walls 55, such as the oblique side walls 58 formed on the lower surface of the bobbin 23, are disposed around the ferrite pieces 45, and the support walls 26 that support the walls 55, with the support plate 21 interposed therebetween, are formed on the base plate 25.

The walls 55 are formed such that the interval between the notch wall 60 and the corresponding oblique side wall 58 is narrower than the width of the wheels 15 of the vehicle 2.

With the above arrangement, when a wheel of the vehicle 2 runs on top of the resin lid 24, the walls 55 and the support walls 26 support a load received from the wheel 15. As a result, portions of the bobbin 23 located between the walls 55 and the support walls 26 are less likely or unlikely to undergo deflection under the load. As a result, the bobbin 23 and the ferrite pieces 45 are less likely or unlikely to contact with each other, and the ferrite pieces 45 are less likely or unlikely to crack or break.

Next, the configuration of the electric power receiving device 4 will be described, with reference to FIG. 13 and other figures. Since the electric power receiving device 4 is similar in configuration to the electric power transmission device 3, the configuration of the power receiving device 4 will be simply described.

Figure 13:
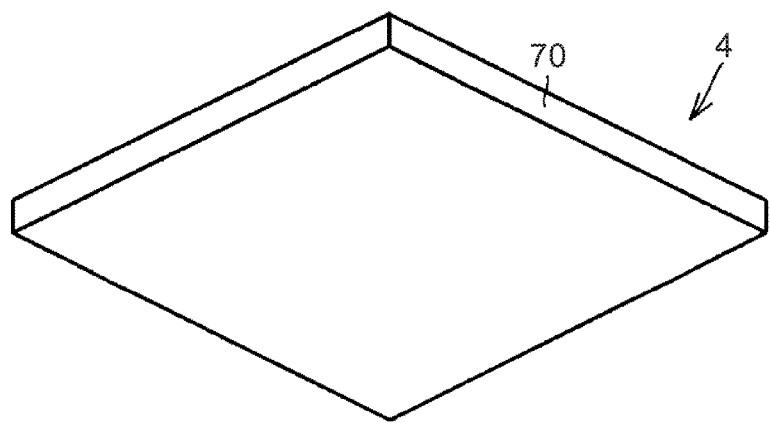
FIG. 13 is a perspective view showing an electric power receiving device 4.
Figure 14:
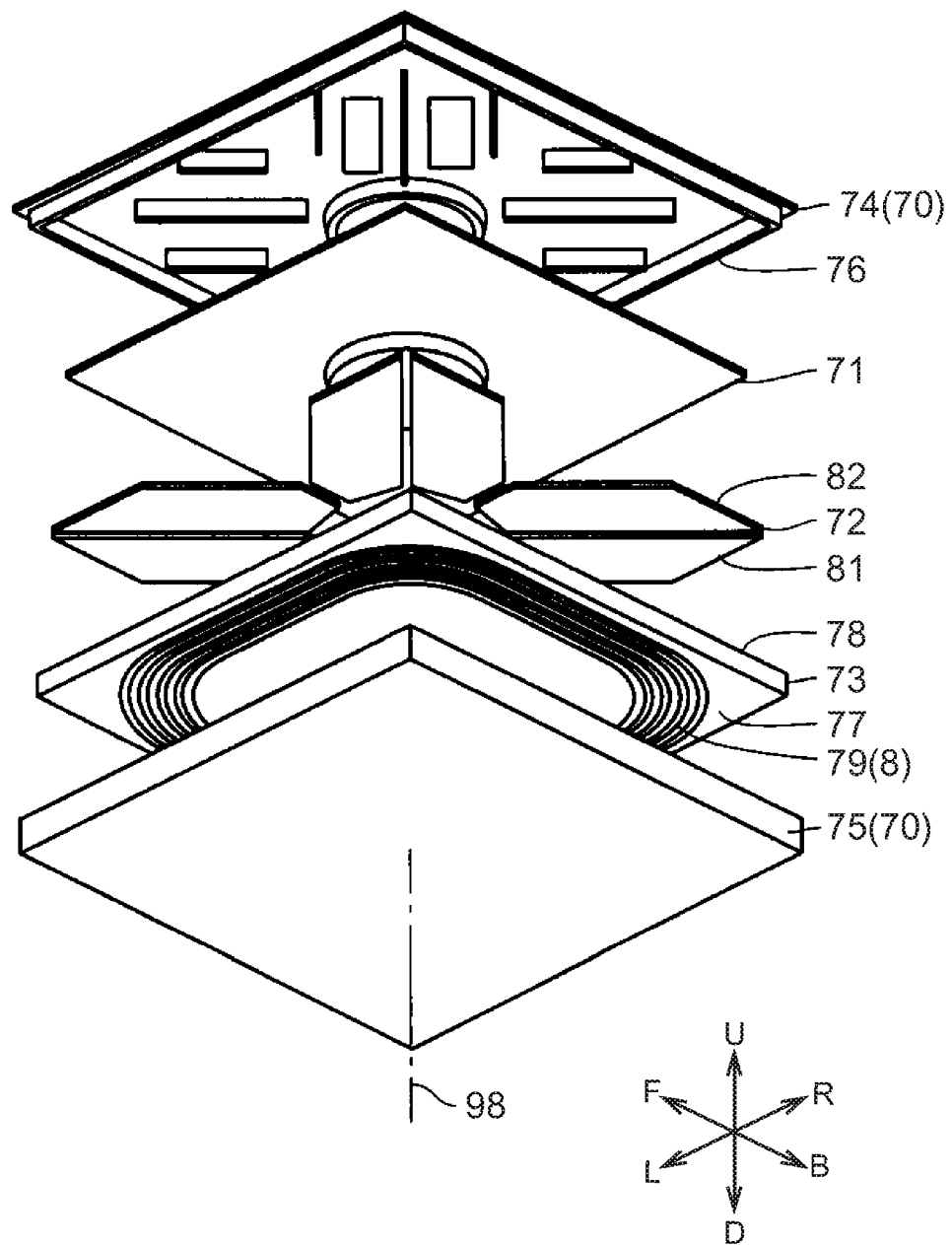
FIG. 14 is an exploded perspective view showing the power receiving device 4.

FIG. 13 is a perspective view showing the electric power receiving device 4, and FIG. 14 is an exploded perspective view showing the power receiving device 4. As shown in FIG. 14, the power receiving device 4 includes a case 70, a support plate 71, a ferrite 72, and a bobbin 73. The support plate 71, the ferrite 72, and the bobbin 73 are housed in the case 70.

The case 70 includes a base plate 74 made of metal, and a resin plate 75 disposed below the base plate 74 so as to cover the base plate 74.

Support walls 76 are formed on the lower surface of the base plate 74. The support plate 71 is disposed on the lower surface of the base plate 74. The ferrite 72 is disposed on the lower surface of the support plate 71. The ferrite 72 is in the form of a flat plate, and includes a lower surface 81 (first major surface) and an upper surface 82 (second major surface) which are arranged in the thickness direction of the ferrite 72.

The bobbin 73 is disposed on the lower surface 81 side of the ferrite 72. A coil groove 79 in which the power receiving coil 8 is received is formed in a lower surface 77 of the bobbin 73.

Figure 15:
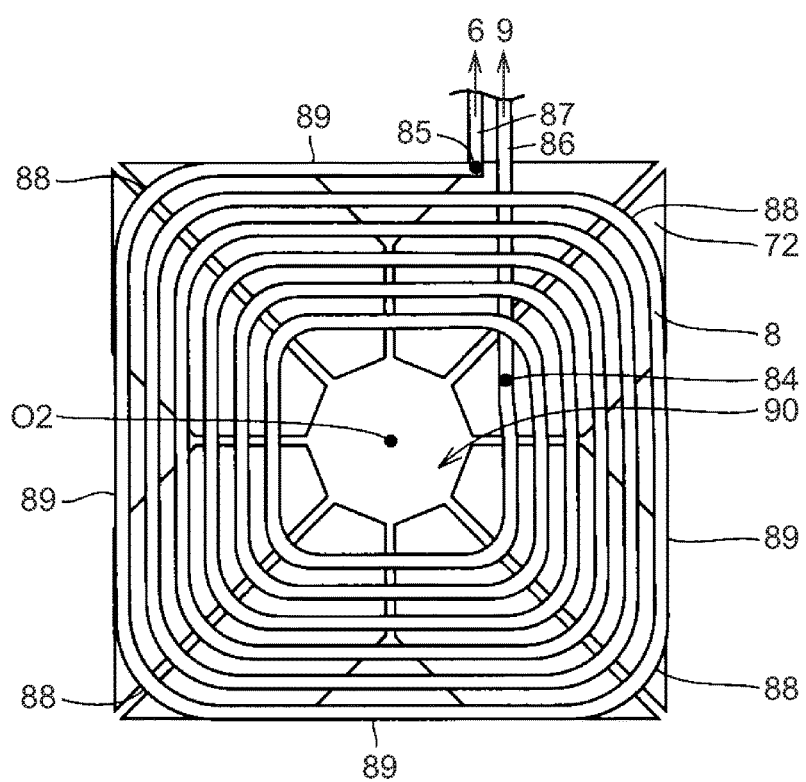
FIG. 15 is a plan view of a power receiving coil 8 and a ferrite 72 when viewed from below the power receiving coil 8 and the ferrite 72.

FIG. 15 is a plan view of the power receiving coil 8 and the ferrite 72 as viewed from an observation position 98 shown in FIG. 14. As shown in FIG. 15, the power receiving coil 8 surrounds the winding axis O2. The power receiving coil 8 includes an inner end 84 and an outer end 85, and the distance from the winding axis O2 increases as the number of turns increases from the inner end 84 toward the outer end 85. The observation position 98 shown in FIG. 14 is located apart from the power receiving coil 8 in the direction in which the winding axis O2 extends.

A lead wire 86 connected to the capacitor 9 is connected to the inner end 84, and a lead wire 87 connected to the rectifier 6 is connected to the outer end 85.

The outline of the power receiving coil 8 has a generally polygonal shape, and the outer periphery of the power receiving coil 8 includes a plurality of bent portions 88, and side portions 89 that connect adjacent ones of the bent portions 88.

The power receiving coil 8 is formed in a hollow shape, and a hollow portion 90 is defined in a central portion of the power receiving coil 8.

Figure 16:
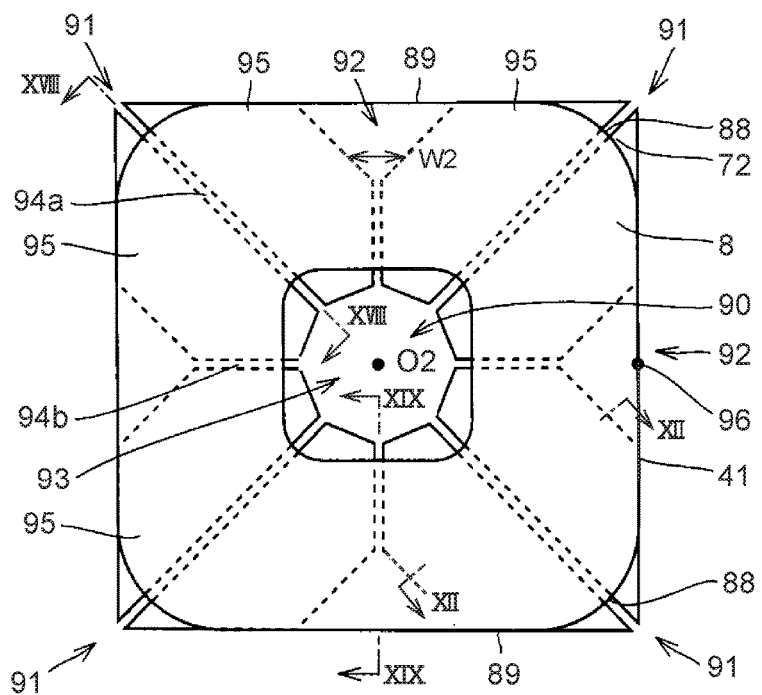
FIG. 16 is a plan view showing the power receiving coil 8 in a simplified form and the ferrite 72.

FIG. 16 is a plan view showing the power receiving coil 8 in a simplified form, and the ferrite 72. A hole portion 93 is defined in a central portion of the ferrite 72. When the power receiving coil 8 and the ferrite 72 are viewed from below the power receiving coil 8 and the ferrite 72, the hole portion 93 is located within the hollow portion 90 of the power receiving coil 8. Namely, a part of the ferrite 72 is exposed through the hollow portion 90.

The outline of the ferrite 72 has a generally polygonal shape, and the ferrite 72 includes a plurality of corner portions 91, and notch portions 92 are defined between the corner portions 91. When the power receiving coil 8 and the ferrite 72 are viewed from below the power receiving coil 8 and the ferrite 72, the notch portions 92 are arranged so as to overlap the power receiving coil 8. Thus, since the ferrite 72 is provided with the notch portions 92, the manufacturing cost is reduced, as compared with a ferrite that is not provided with notch portions.

In the example shown in FIG. 16, each of the notch portions 92 is located so as to overlap a middle portion of the adjacent bent portions 88. More specifically, the notch portion 92 is located so as to overlap a middle portion of the corresponding side portion 89.

The width W2 of the notch portion 92 as measured in the circumferential direction of the power receiving coil 8 increases as the distance from the hollow portion 90 of the power receiving coil 8 increases.

In the ferrite 72, a plurality of first gap portions 94a and second gap portions 94b, which extend radially from the hole portion 93, are defined. The first gap portions 94a and the second gap portions 94b extend radially from the winding axis O2 as the center. The first gap portions 94a reach the corresponding corner portions 91, and the second gap portions 94b reach the corresponding notch portions 92.

The ferrite 72 includes a plurality of ferrite pieces 95 that are arranged at intervals in the circumferential direction of the power receiving coil 8.

Figure 17:
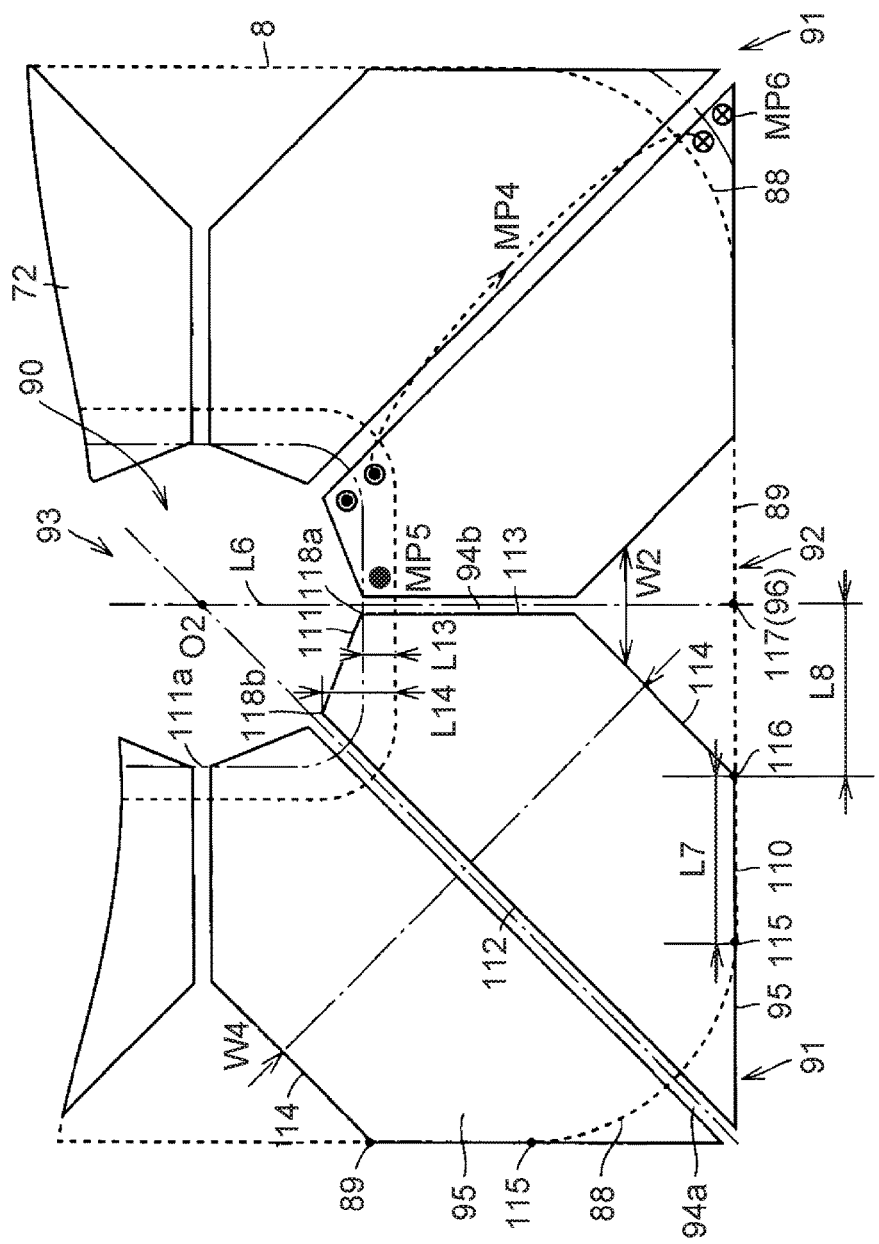
FIG. 17 is a plan view showing ferrite pieces 95.

FIG. 17 is a plan view showing the ferrite pieces 95. As shown in FIG. 17, each of the ferrite pieces 95 includes a radially outer side 110, radially inner side 111, oblique side 112, short side 113, and a notch side 114.

The radially outer side 110 forms an outer periphery of the corresponding corner portion 91, and also forms a part of the outer periphery of the ferrite 72. The radially inner side 111 forms a part of the periphery of the hole portion 93. The oblique side 112 connects one end of the radially inner side 111 and one end of the radially outer side 110.

One end of the notch side 114 is connected to the other end of the radially outer side 110, and the notch side 114 forms a part of the periphery of the corresponding notch portion 92. The short side 113 connects the other end of the radially inner side 111 and the other end of the notch side 114. The notch side 114 and the oblique side 112 are parallel to each other.

The short side 113 and the radially inner side 111 form a corner portion 118a, and the radially inner side 111 and the oblique side 112 form a corner portion 118b.

In the periphery of the hole portion 93, the corner portion 118a is located closest to the corresponding middle portion 96, and the corner portion 118b is located closest to the corresponding corner portion 91.

The first gap portions 94a are defined between the oblique sides 112 of adjacent ones of the ferrite pieces 95, and the second gap portions 94b are defined between the short sides 113 of adjacent ones of the ferrite pieces 95.

Further, the notch portions 92 are defined by the notch sides 114 of adjacent ones of the ferrite pieces 95.

Here, in the outer periphery of the power receiving coil 8, inflection points located at boundaries between the bent portions 88 and the side portions 89 are denoted as inflection points 115. Also, corner portions formed by the notch sides 114 and the radially outer sides 110 are denoted as corner portions 116.

Further, a virtual line that passes the winding axis O2, and intersects at right angles with one of the side portion 89, is denoted as straight line L6, and an intersection point between the straight line L6 and the side portion 89 is denoted as intersection point 117. Where the distance between the inflection point 115 and the corner portion 116 is denoted as distance L7, and the distance between the corner portion 116 and the intersection point 117 is denoted as distance L8, the distance L8 is equal to or less than the distance L7.

Further, where the shortest distance between the corner portion 118a and the periphery of the hollow portion 90 is denoted as distance L13, and the distance between the corner portion 118b and the periphery of the hollow portion 90 is denoted as distance L14, the distance L14 is longer than the distance L13.

Suppose that a radially inner side 111a is formed such that the distance between the side 111a and the periphery of the hollow portion 90 is constant (distance L13), as indicated by the two-dot chain line in FIG. 17. If the radially inner side 111a is compared with the radially inner side 111 of this embodiment, the corner portion 118b of the radially inner side 111 and its surrounding portion extend toward the winding axis O2, to be closer to the axis O2 than the radially inner side 111a.

In the example shown in FIG. 17, the distance between the hollow portion 90 and the radially inner side 111 changes from the distance L13 to the distance L14, in a direction from the corner portion 118a to the corner portion 118b. Namely, the radially inner side 111 is positioned so as to be inclined relative to the periphery of the hollow portion 90, such that the distance between the hollow portion 90 and the radially inner side 111 increases. Therefore, the area of the ferrite 72 that is exposed through the hollow portion 90 increases from the corner portion 118a toward the corner portion 118b.

Since the width W2 of the notch portion 92 is reduced toward the hollow portion 90, a channel width W4 is less likely or unlikely to be locally reduced, between the corner portion 116 and the apex of the notch portion 92.

Figure 18:
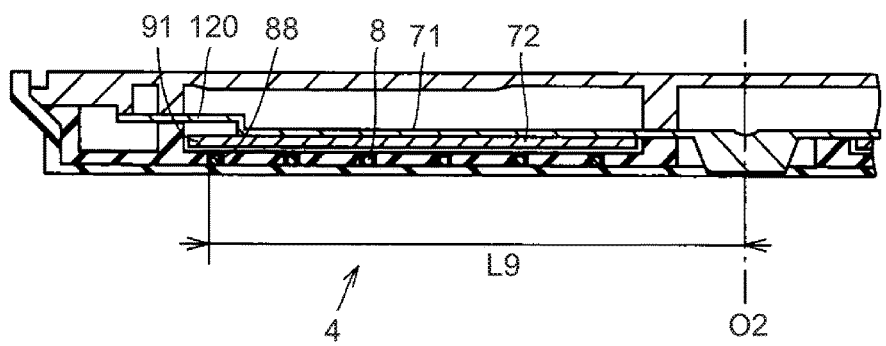
FIG. 18 is a cross-sectional view of the power receiving device 4 as viewed in a cross section taken along line XVIII-XVIII shown in FIG. 16.
Figure 19:
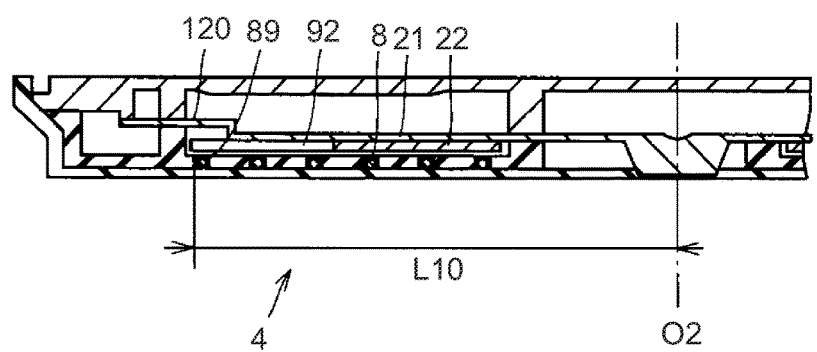
FIG. 19 is a cross-sectional view of the power receiving device 4 as viewed in a cross section taken along line XIX-XIX shown in FIG. 16.

FIG. 18 is a cross-sectional view of the electric power receiving device 4 as viewed in a cross section taken along line XVIII-XVIII shown in FIG. 16. More specifically, FIG. 18 is a cross-sectional view of the power receiving device 4 as viewed in a cross section that extends from the winding axis O2, passes through one of the first gap portions 94a, and reaches the corresponding corner portion 91. FIG. 19 is a cross-sectional view as viewed in a cross section taken along line XIX-XIX shown in FIG. 16. More specifically, FIG. 19 is a cross-sectional view of the power receiving device 4 as viewed in a cross section that extends from the winding axis O2, and passes through one of the second gap portions 94b and the corresponding notch portion 92.

In FIG. 18, a stepped portion 120 is formed in an outer peripheral portion of the support plate 71 such that the stepped portion 120 is spaced apart from the upper surface of the ferrite pieces 95. The distance from the winding axis O2 to the bent portion 88 of the power receiving coil 8 is denoted as distance L9.

Similarly, in FIG. 19, the distance from the winding axis O2 to the side portion 89 of the power receiving coil 8 is denoted as distance L10. In this case, the distance L10 is shorter than the distance L9. This is because the outline of the power receiving coil 8 has a generally polygonal shape, and the bent portions 88 of the power receiving coil 8 are located farther from the winding axis O2 than the side portions 89 of the power receiving coil 8.

Figure 20:
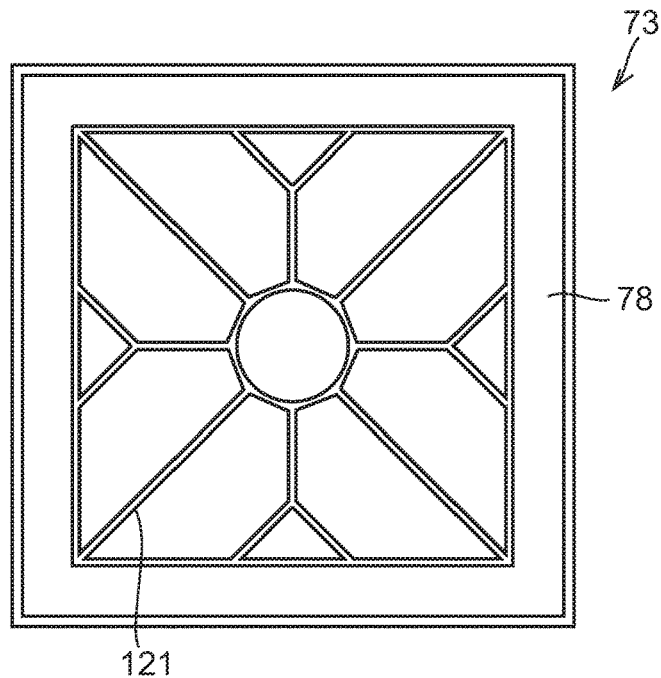
FIG. 20 is a plan view showing an upper surface 78 of a bobbin 73.

FIG. 20 is a plan view showing an upper surface 78 of the bobbin 73. As shown in FIG. 20, walls 121 that surround the respective ferrite pieces 95 are formed.

Figure 21:
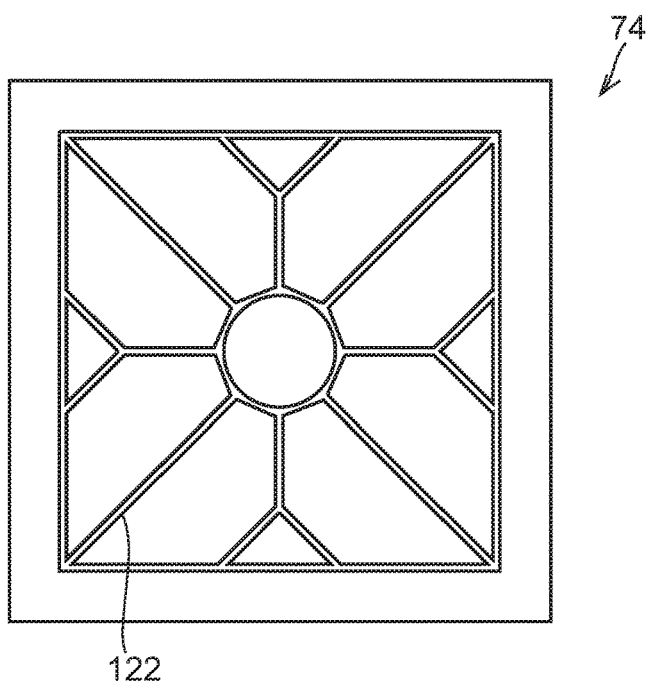
FIG. 21 is a plan view showing a lower surface of a base plate 74.

FIG. 21 is a plan view showing a lower surface of the base plate 74. As shown in FIG. 21, support walls 122 that support the walls 121 are formed on the lower surface of the base plate 74.

Therefore, even when a foreign matter, such as a stone, comes into contact with the power receiving device 4, during traveling of the vehicle 2, external force is less likely or unlikely to be applied to the ferrite pieces 95, and the ferrite pieces 95 are less likely or unlikely to crack or break.

As described above, in the power transmission device 3 and the power receiving device 4, the notch portions 42, 92 are defined in the respective ferrites 22, 72; therefore, the manufacturing cost is reduced. With the power transmission device 3 and the power receiving device 4 according to the first embodiment, a high coupling coefficient can be obtained during electric power transmission, as will be described below.

In FIG. 1, when electric power is contactlessly or wirelessly transmitted from the power transmission device 3 to the power receiving device 4, the power receiving coil 8 is placed above the power transmission coil 12. When the power transmission coil 12 and the power receiving coil 8 are accurately positioned relative to each other, the winding axis O1 coincides with the winding axis O2, as shown in FIG. 22.

Then, in FIG. 1, the converter 11 supplies AC power of a given frequency to the resonator 14, so that AC current flows through the power transmission coil 12. The frequency of the AC current flowing through the power transmission coil 12 is made equal to the resonance frequency of the resonator 14, for example.

If the AC current flows through the power transmission coil 12, magnetic flux is formed around the power transmission coil 12. When the frequency of the AC current supplied to the power transmission coil 12 is equal to the resonance frequency of the resonator 14, the frequency of a magnetic field formed around the power transmission coil 12 also becomes equal to the resonance frequency of the resonator 14.

Figure 22:
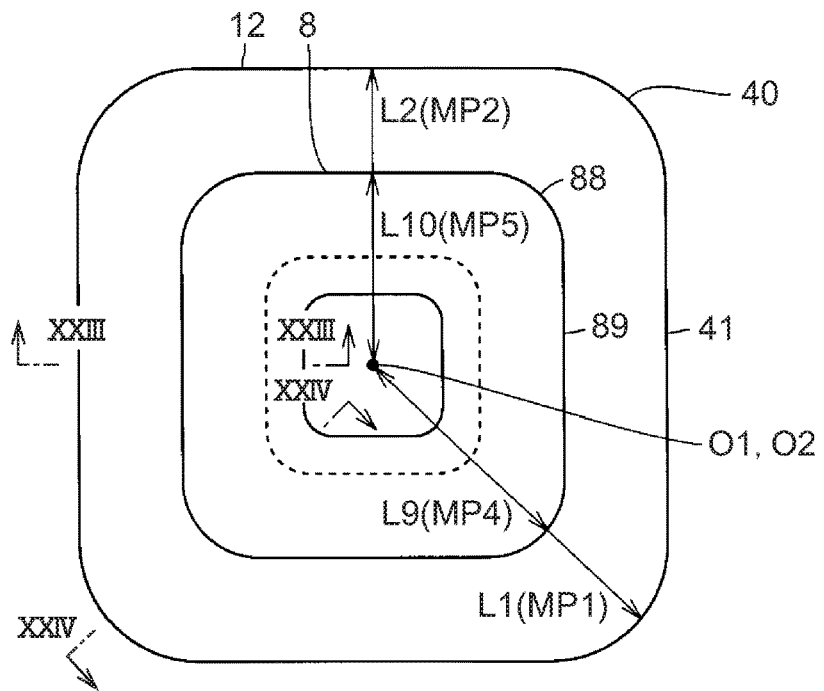
FIG. 22 is a plan view showing a condition where the power receiving coil 8 and the power transmission coil 12 are positioned relative to each other.

In FIG. 22, the magnetic flux formed around the transmission coil 12 is emitted radially from the winding axis O1 and its surroundings.

In this connection, the distance L2 between the winding axis O1 and each side portion 41 is shorter than the distance L1 between the winding axis O1 and each bent portion 40. In particular, the distance between the middle portion of the side portion 41 and the winding axis O1 is shortest.

Then, a magnetic path MP2 that proceeds from the winding axis O1 and its vicinity to the middle portion of the side portion 41, and a magnetic path MP1 that proceeds from the winding axis O1 and its vicinity to the bent portion 40 will be described.

Figure 23:
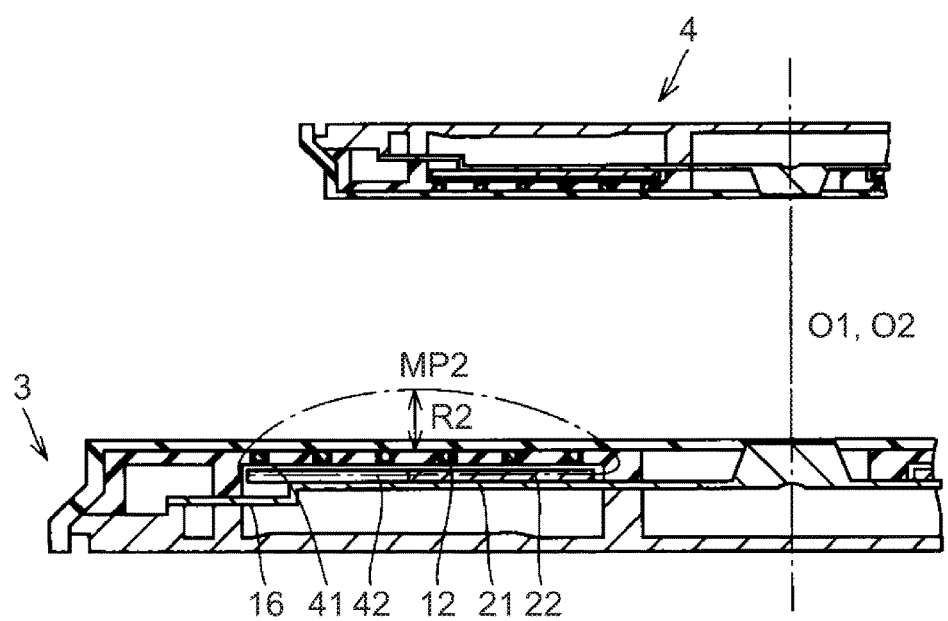
FIG. 23 is a cross-sectional view of the power transmission device 3 and the power receiving device 4 as viewed in a cross section taken along line XXIII-XXIII in FIG. 22.

FIG. 23 is a cross-sectional view of the power transmission device 3 and the power receiving device 4 as viewed in a cross section taken along line XXIII-XXIII in FIG. 22, and a cross-sectional view of a cross section that passes the winding axes O1, O2 and a middle portion of one of the side portions 41.

In FIG. 23, the notch portion 42 is defined in a portion of the ferrite 22 located adjacent to the middle portion of the side portion 41 of the power transmission coil 12. Therefore, magnetic flux MF that travels along the magnetic path MP2 flows from the winding axis O1 and its vicinity toward the outer side of the side portion 41, and enters the ferrite 22, after passing through the notch portion 42. Then, the magnetic flux MF returns to the winding axis O1 and its vicinity.

Figure 24:
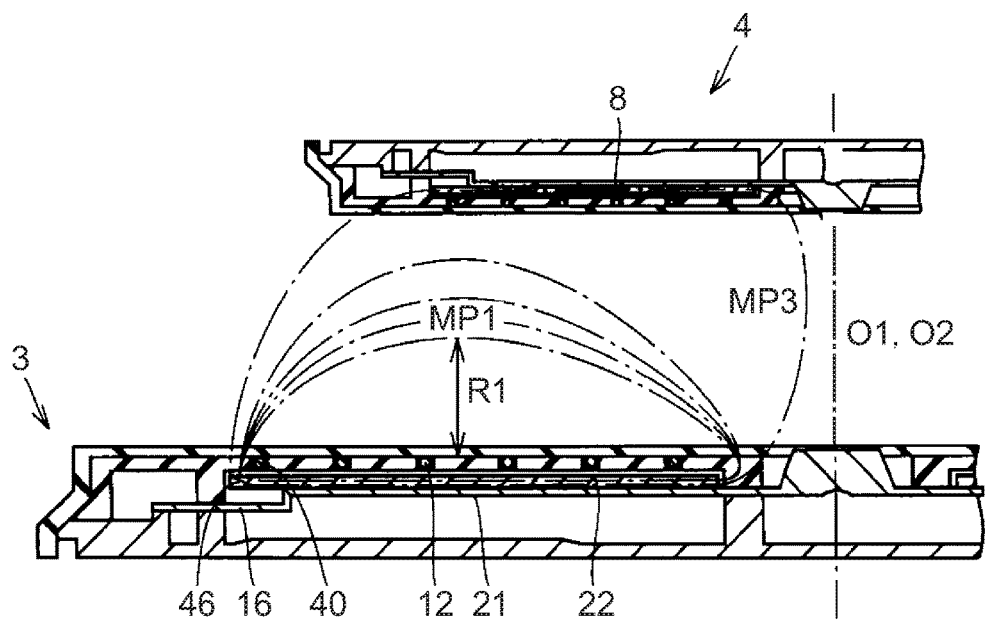
FIG. 24 is a cross-sectional view taken along line XXIV-XXIV in FIG. 22, showing a cross section that passes winding axes O1, O2 and a bent portion 44.

FIG. 24 is a cross-sectional view taken along line XXIV-XXIV in FIG. 22, and shows a cross section that passes the winding axes O1, O2 and one of the bent portions 40. As shown in FIG. 24, magnetic flux MF that travels along the magnetic path MP1 flows from the winding axis O1 and its vicinity, goes beyond the bent portion 40, and enters the corner portion 46. As shown in FIG. 7, the corner portion 46 of the ferrite 22 is formed so as to extend outwardly of the bent portion 40 of the power transmission coil 12. Therefore, the magnetic flux MF that travels along the magnetic path MP1 can immediately enters the corner portion 46 once it passes the outer side of the bent portion 40 of the power transmission coil 12. The magnetic flux MF incident on the corner portion 46 passes through the ferrite 22, and returns to the winding axis O1 and the vicinity of the winding axis O1 again.

In FIG. 23 and FIG. 24, since the magnetic flux MF that travels along the magnetic path MP2 needs to pass through the notch portion 42, the distance over which the magnetic flux MF passes through air in the magnetic path MP2 is longer than that in the magnetic path MP1.

Since the magnetic resistance of the ferrite 22 is far smaller than that of air, the magnetic resistance in the magnetic path MP1 is smaller than that in the magnetic path MP2.

As a result, the amount of magnetic flux traveling along the magnetic path MP1 is larger than the amount of magnetic flux traveling along the magnetic path MP2.

In FIG. 23, the radius of the magnetic path MP2 is denoted as radius R2. In FIG. 24, the radius of the magnetic path MP1 is denoted as radius R1. When magnetic flux travels along the magnetic path MP2, some magnetic flux MF passes positions close to the power transmission coil 12, and other magnetic flux MF passes positions remote from the power transmission coil 12. The radius of the magnetic path MP2 is the maximum value of the distance between the path MP2 and the power transmission coil 12, in a path having the average density of magnetic flux MF traveling along the magnetic path MP2. Similarly, the radius of the magnetic path MP1 is the maximum value of the distance between the path MP1 and the power transmission coil 12, in a path having the average density of magnetic flux MF traveling along the magnetic path MP1.

In this embodiment, since the distance L2 between the winding axis O1 and the side portion 41 is shorter than the distance L1 between the winding axis O1 and the bent portion 40, the radius R1 is larger than the radius R2.

With the notch portions 42 provided, the amount of magnetic flux traveling along the magnetic path MP2 is reduced, and the amount of magnetic flux traveling along the magnetic path MP1 is increased, resulting in increase of the amount of magnetic flux passing positions remote from the power transmission coil 12, out of the magnetic flux MF traveling along the magnetic path MP1. As a result, the radius R1 of the magnetic path MP1 is increased. The larger the radius R1 is, the larger amount of magnetic flux MF becomes close to the power receiving coil 8.

Then, the magnetic resistance is lower in a magnetic path MP3 along which the magnetic flux MF returns to the power transmission coil 12 after being interlinked with the power receiving coil 8, as compared with that in the magnetic path MP1 along which the magnetic flux MF passes positions spaced a given distance from the power transmission coil 12.

As a result, a part of the magnetic flux MF formed around the power transmission coil 12 is interlinked with the power receiving coil 8. In particular, as the amount of magnetic flux traveling along the magnetic path MP1 increases, the amount of magnetic flux interlinked with the power receiving coil 8 increases.

Thus, by providing the notch portions 42 at positions adjacent to the side portions 41 of the power transmission coil 12, in the outer peripheral portion of the ferrite 22, it is possible to increase the amount of magnetic flux directed to the corner portions 46 of the power transmission coil 12, and thus increase the amount of magnetic flux interlinked with the power receiving coil 8. As a result, the coefficient of coupling of the power transmission coil 12 and the power receiving coil 8 can be improved, as compared with the case where the notch portions 42 are not provided.

When the magnetic flux MF emitted from the power transmission coil 12 is interlinked with the power receiving coil 8, induction electromotive voltage is generated in the power receiving coil 8, and AC current flows through the power receiving coil 8.

When the frequency of the magnetic field (magnetic flux) formed around the power transmission coil 12 is equal to the resonance frequency of the resonator 14, the frequency of the induction electromotive voltage generated in the power receiving coil 8 is also equal to the resonance frequency of the resonator 14. Since the resonance frequency of the resonator 5 of the power receiving device 4 coincides with the resonance frequency of the resonator 14 of the power transmission device 3, large AC current flows through the power receiving coil 8.

The impedance of the resonance circuit is minimized when the frequency of the applied voltage coincides with the resonance frequency of the resonance circuit (when the circuit is in a resonant condition). Therefore, large current flows through the resonator 5 of the power receiving device 4. Further, in this embodiment, the Q value of the resonator 5 of the power receiving device 4 is equal to or larger than 100; therefore, the amount of current flowing through the resonator 5 in a resonant condition can be increased, as compared with a resonator having a low Q value. Thus, large AC current flows through the power receiving coil 8.

With the AC current thus flowing through the power receiving coil 8 as described above, magnetic flux MF is also formed around the power receiving coil 8. The magnetic flux MF formed around the power receiving coil 8 is emitted radially from the winding axis O2 as the center.

Here, as shown in FIG. 22, the distance L9 between the winding axis O2 and the bent portion 88 is longer than the distance L10 between the winding axis O2 and the side portion 89. In the following, a magnetic path MP4 that passes the winding axis O2 and the bent portion 88 side, and a magnetic path MP5 that passes the winding axis O2 and the side portion 89 side, will be described.

Figure 25:
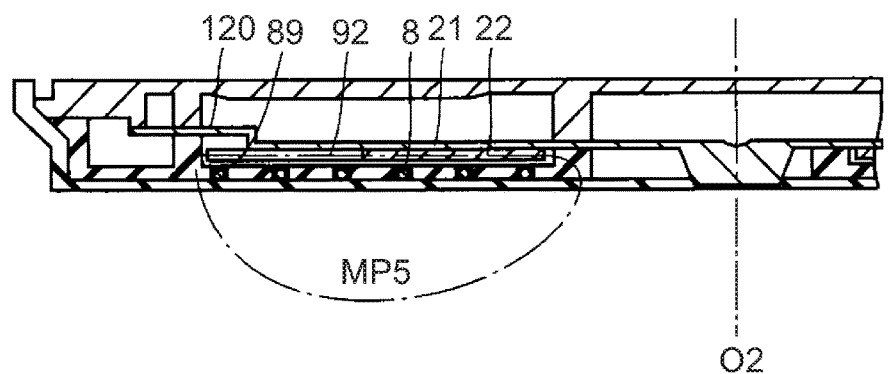
FIG. 25 is an enlarged cross-sectional view of the power receiving device 4 shown in FIG. 23.
Figure 26:
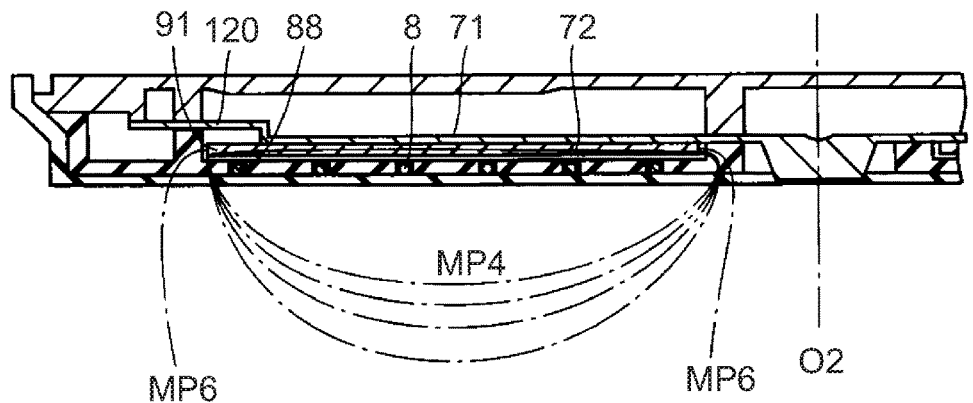
FIG. 26 is an enlarged cross-sectional view of the power receiving device 4 shown in FIG. 24.

FIG. 25 is an enlarged cross-sectional view of the power receiving device 4 shown in FIG. 23, and FIG. 26 is an enlarged cross-sectional view of the power receiving device 4 shown in FIG. 24.

As shown in FIG. 25, the magnetic flux traveling along a magnetic path MP5 passes though the outer side of the side portion 89 of the power receiving coil 8, and then passes through the notch portion 92. On the other hand, as shown in FIG. 26, the magnetic flux traveling along a magnetic path MP4 enters the corner portion 91 of the ferrite 72 immediately after passing the outer side of the bent portion 88. As a result, the distance over which the magnetic flux passes through air is shorter in the magnetic path MP4, than in the magnetic path MP5, and the magnetic resistance is lower in the magnetic path MP4, than in the magnetic path MP5. Therefore, the amount of magnetic flux traveling along the magnetic path MP4 is larger than the amount of magnetic flux traveling along the magnetic path MP5.

As the amount of magnetic flux traveling along the magnetic path MP4 increases, the magnetic flux MF that passes positions remote from the power receiving coil 8 increases. As a result, the magnetic flux MF traveling along a magnetic path MP6 interlinked with the power transmission coil 12 is increased.

Thus, in the power receiving device 4, too, the provision of the notch portions 92 makes it possible to guide magnetic flux formed by the power receiving coil 8 to the power transmission coil 12, and the coefficient of coupling of the power receiving coil 8 and the power transmission coil 12 can be improved.

As shown in FIG. 6, each of the notch portions 42 is located at a position overlapping the middle portion 48 of the side portion 41 of the power transmission coil 12. If the notch portion 42 is not located at the above position, a large amount of magnetic flux MF would flow through a magnetic path that passes the outer side of the middle portion 48 since the distance between the middle portion 48 and the winding axis O1 is short. As a result, the amount of magnetic flux MF interlinked with the power receiving coil 8 is reduced.

On the other hand, in the power transmission device 3 according to this embodiment, the notch portion 42 is located at a position overlapping the middle portion 48. Therefore, the magnetic flux MF that flows from the winding axis O1 and passes the outer side of the middle portion 48 can be reduced, and the magnetic flux interlinked with the power receiving coil 8 can be increased.

As described above, in the power transmission device 3 and the power receiving device 4 according to the first embodiment, the provision of the notch portions 42, 92 in each of the ferrites 22, 72 leads to reduction of the manufacturing cost and ensures a high coupling coefficient. While the notch portions are provided in both the power transmission device 3 and the power receiving device 4 in the first embodiment, notch portions may be provided in one of the power transmission device 3 and the power receiving device 4. Next, the effects provided by various arrangements of the power transmission device 3 and the power receiving device 4 will be described.

As shown in FIG. 8, the stepped portion 16 is formed in the outer peripheral portion of the support plate 21; therefore, the magnetic flux MF can enter the ferrite 22 not only from the upper surface of the corner portion 46 shown in FIG. 7, but also from the lower surface of the corner portion 46, and the lower surface of the radially outer side 50 of the ferrite piece 45. Thus, the area over which the magnetic flux MF can enter the ferrite 22 is sufficiently large; therefore, the magnetic flux MF is less likely or unlikely to be concentrated on a part of the ferrite 22, and magnetic saturation is less likely or unlikely to occur at and around the corner portion 46.

Also, in the power receiving device 4, the stepped portion 120 is formed in the outer peripheral portion of the support plate 71, as shown in FIG. 18; therefore, magnetic saturation is less likely or unlikely to occur at and around the corner portion 91.

Also, as shown in FIG. 7, each of the notch portions 42 is formed such that the width W1 of the notch portion 42 decreases toward the hollow portion 37; therefore, the width W3 of the flow channel through which the magnetic flux MF flows in the ferrite 22 is less likely or unlikely to be reduced, and magnetic saturation is less likely or unlikely to occur in the ferrite 22, even if the magnetic flux MF enters the ferrite 22 from the upper surface and lower surface of the corner portion 46 and the lower surface of the radially outer side 50.

In particular, the distance L4 is equal to or larger than the distance L5, and the notch side 54 of the ferrite piece 45A and the notch side 54 of the ferrite piece 45B are both parallel to the oblique side 52; therefore, the flow channel width W3 is constant over a range from the corner portion 67 to the apex of the notch portion 42.

With the above arrangement, the flow channel width of the magnetic flux MF is not reduced in local parts, and the magnetic flux MF can favorably flow in the ferrite 22. Accordingly, the flow channel of magnetic flux interlinked with the power receiving coil 8 is secured, and a high coupling coefficient can be ensured.

In the power receiving device 4, too, the flow channel width W4 is constant over a range from the corner portion 116 to the apex of the notch portion 92. Therefore, in the power receiving device 4, too, magnetic saturation is less likely or unlikely to occur, and a high coupling coefficient can be ensured.

In FIG. 7, the magnetic flux MF that travels along the magnetic paths MP1-MP3 emits from a portion of the ferrite 22 which is exposed through the hollow portion 37. Then, the magnetic flux that travels along the magnetic path MP1 and magnetic path MP3 is incident upon the corner portion 46, and the magnetic flux that travels along the magnetic path MP2 enters the ferrite 22 from the periphery of the notch portion 42.

The magnetic flux that travels along the magnetic path MP1 and the magnetic path MP3 mainly passes through a portion of the ferrite 22 located between the corner portion 69b and the periphery of the hollow portion 37, and its vicinity. On the other hand, the magnetic flux that travels along the magnetic path MP2 mainly passes through a portion of the ferrite 22 located between the corner portion 69a and the periphery of the hollow portion 37, and its vicinity. The amount of magnetic flux as the sum of the amount of magnetic flux flowing along the magnetic path MP1 and the amount of magnetic flux flowing along the magnetic path MP3 is larger than the amount of magnetic flux flowing along the magnetic path MP2.

In the meantime, the ferrite 22 is formed such that the distance between the radially inner side 51 and the periphery of the hollow portion 37 increases from the corner portion 69a side toward the corner portion 69b side. As a result, the area of the ferrite 22 exposed through the hollow portion 37 is larger on the corner portion 69b side, than on the corner portion 69a side.

With the above arrangement, in the ferrite 22 exposed through the hollow portion 37, the area from which the magnetic flux flowing along the magnetic paths MP1, MP3 emits is larger than the area from which the magnetic flux flowing along the magnetic path MP2 emits. Therefore, magnetic saturation is less likely or unlikely to occur in the portion of the ferrite 22 exposed through the hollow portion 37, and the flow channel of magnetic flux that flows along the magnetic path MP3 can be secured.

As shown in FIG. 24, the magnetic path MP1 extends on the inner side of the magnetic path MP3. Therefore, the position from which the magnetic flux MF emits and travels along the magnetic path MP3 needs to be located on the side closer to the winding axis O1 than the position from which the magnetic flux MF emits and travels along the magnetic path MP1. Further, the position at which the magnetic flux MF traveling along the magnetic path MP3 is incident upon the ferrite 22 needs to be located on the outer side of the position at which the magnetic flux MF traveling along the magnetic path MP1 is incident upon the ferrite 22.

The corner portion 69b is located on one side of the radially inner side 51a closer to the winding axis O1. Therefore, the magnetic flux traveling along the magnetic path MP1 can mainly emit from one side of the radially inner side 51a closer to the periphery of the hollow portion 37, as a part of the ferrite 22 exposed through the hollow portion 37. Further, the magnetic flux traveling along the magnetic path MP3 can mainly emit from one side of the radially inner side 51a closer to the winding axis O1.

The radially outer side 50 extends straight on one side of the inflection point 66 closer to the distal end of the corner portion 46 as well as on the other side, whereas the bent portion 40 of the power transmission coil 12 is curved.

Therefore, the magnetic flux traveling along the magnetic path MP1 can enter a region R1 of the corner portion 46 which is located in the vicinity of the bent portion 40, and the magnetic flux traveling along the magnetic path MP3 can enter a region R2 of the corner portion 46 which is located on the outer side of the region R1.

Thus, the radially inner side 51 is inclined relative to the periphery of the hollow portion 37, and the radially outer side 50 extends straight, so that the magnetic path MP1 and the magnetic path MP3 can be formed as separate paths. Thus, in the ferrite 22, portions where a large amount of magnetic flux MF enters and emits are locally generated, and magnetic saturation is less likely or unlikely to occur. As a result, the flow channel of magnetic flux traveling along the magnetic path MP3 is secured, and a high coupling coefficient can be obtained.

In the power receiving device 4, too, the radially inner side 111 is inclined relative to the periphery of the hollow portion 90 such that the distance L14 is larger than the distance L13, as shown in FIG. 17. Also, the radially outer side 110 is formed straight on one side of the inflection point 115 closer to the distal end of the corner portion 91, as well as on the other side. Therefore, magnetic saturation is less likely or unlikely to occur in the ferrite 72.

As shown in FIG. 6, the ferrite 22 is formed from the ferrite pieces 45 formed in the same shape. Since each of the ferrite pieces 45 has the same shape, all of the ferrite pieces 45 can be produced with one type of mold, and the manufacturing cost of the power transmission device 3 can be reduced.

In the power receiving device 4, too, the ferrite 72 is formed from the ferrite pieces 95 having the same shape, and the manufacturing cost of the power receiving device 4 is reduced.

Since the ferrite 22 is formed from the plurality of ferrite pieces 45, the surface area of each ferrite piece 45 is smaller than that of the ferrite 22.

Generally, the process of producing a ferrite in the form of a plate includes a step of putting a ferrite material in the form of powder into a cavity of a mold device, a step of compressing the ferrite material in the mold device so as to form a compressed compact, and a step of sintering the compressed compact.

If a ferrite plate having a large area is to be formed, the filling factor of the ferrite material is likely to vary depending on the position in the cavity, in the step of putting the ferrite material into the cavity. Further, in the sintering step, if a compressed compact having a large area is to be heated, variations are likely to appear in the temperature distribution of the compressed compact. As a result, chipping and cracking are likely to occur in the ferrite plate, and it is difficult to produce the ferrite plate having a large area.

On the other hand, the ferrite 22 according to the first embodiment is formed from the plurality of ferrite pieces 45, and each ferrite piece 45 is smaller in size than the ferrite 22. Therefore, the ferrite pieces 45 can be favorably produced. Consequently, the ferrite 22 can be easily produced, and the manufacturing cost of the ferrite 22 can be reduced.

When a given amount or more of electric power is transmitted to the electric power receiving device 4 installed on the vehicle 2 having a large vehicle height, a large amount of magnetic flux needs to be emitted toward the power receiving device 4; therefore, the power transmission coil 12 and the ferrite 22 need to be large. Thus, even in the case where the ferrite 22 needs to be large, the size of the ferrite 22 can be made large, by making each ferrite piece 45 large within a range in which sufficient quality can be ensured.

In the power receiving device 4, too, the ferrite 72 consists of a plurality of ferrite pieces 95. Therefore, the same effect as that of the power transmission device 3 can be obtained.

While one notch portion is provided in each side portion of the ferrite 22, 72, in the above-described first embodiment, two or more notch portions may be provided in each side portion. Also, various shapes may be employed as the shape of notch portions.

Figure 27:
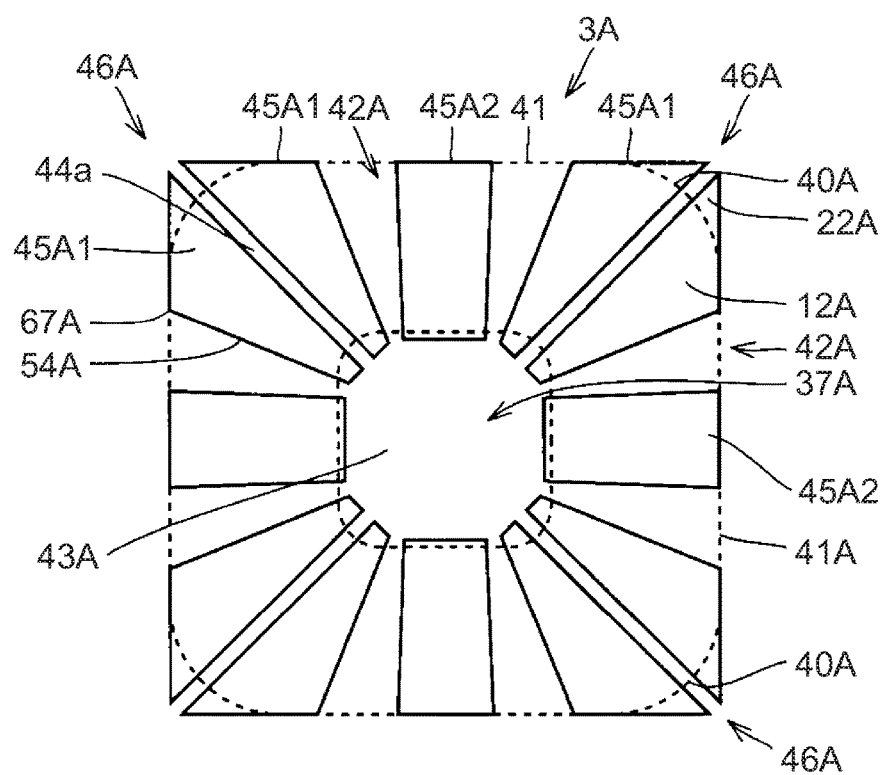
FIG. 27 is a plan view showing a ferrite 22A and a power transmission coil 12A of an electric power transmission device 3A according to a second embodiment.

FIG. 27 is a plan view showing a ferrite 22A and a power transmission coil 12A of an electric power transmission device 3A according to a second embodiment. As shown in FIG. 27, an outer peripheral portion of the ferrite 22A includes a plurality of corner portions 46A, and a plurality of notch portions 42A are defined between the corner portions 46A, in the outer peripheral portion of the ferrite 22A.

Each of the corner portions 46A extends outwardly of a corresponding one of bent portions 40A of the power transmission coil 12A, and each of the notch portions 42A is positioned so as to overlap a corresponding one of side portions 41A of the power transmission coil 12A.

The width of each of the notch portions 42A as measured in the circumferential direction of the power transmission coil 12A decreases toward the winding axis O1.

The ferrite 22A includes a plurality of ferrite pieces 45A1 that form the corner portions 46A, and ferrite pieces 45A2 disposed between adjacent ones of the corner portions 46A. Each of the corner portions 46A is formed from a pair of adjacent ferrite pieces 45A1 with a first gap portion 44a interposed therebetween.

Each of the ferrite pieces 45A2 is formed in a rectangular shape. A notch side 54A of each ferrite piece 45A1 is formed so as to extend from a corner portion 67A of the power transmission coil 12A toward the winding axis O1.

In the power transmission device 3A configured as described above, the amount of magnetic flux directed from the winding axis O1 toward the side portions 41A of the power transmission coil 12A can be reduced. As a result, the magnetic flux interlinked with a power receiving coil 8A can be increased.

Figure 28:
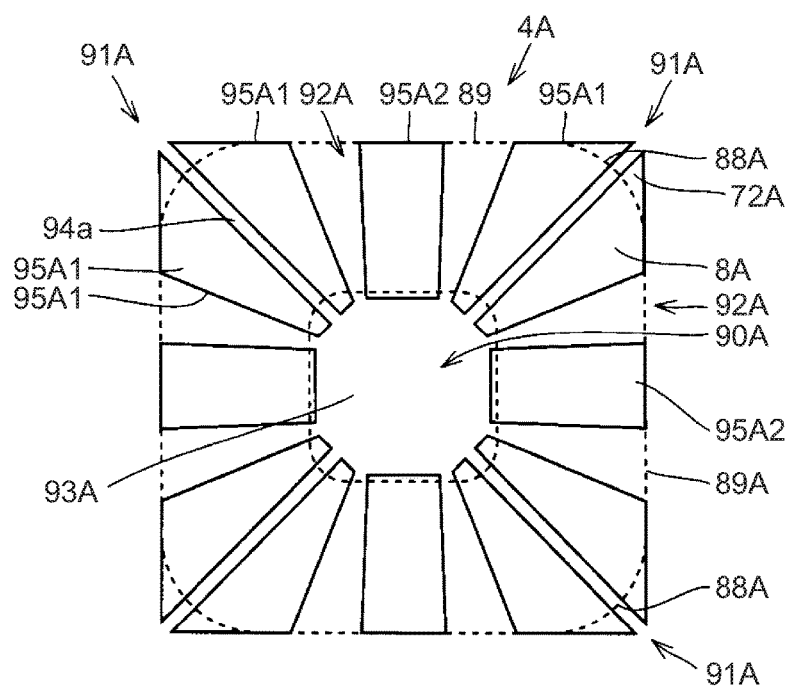
FIG. 28 is a plan view showing a ferrite 72A and a power receiving coil 8A of an electric power receiving device 4A according to the second embodiment.

FIG. 28 is a plan view showing a ferrite 72A and the power receiving coil 8A of an electric power receiving device 4A according to the second embodiment.

As shown in FIG. 28, an outer peripheral portion of the ferrite 72A includes a plurality of corner portions 91A, and a plurality of notch portions 92A are defined between the corner portions 91A, in the outer peripheral portion of the ferrite 72A.

Each of the corner portions 91A extends outwardly of a corresponding one of bent portions 88A of the power receiving coil 8A.

Each of the notch portions 92A is positioned so as to overlap the power receiving coil 8A. The width of each of the notch portions 92A as measured in the circumferential direction of the power receiving coil 8A decreases toward the winding axis O2.

The ferrite 72A includes a plurality of ferrite pieces 95A1 that form the corner portions 91A, and ferrite pieces 95A2 disposed between the corner portions 91A. Each of the corner portions 91A is formed from a pair of ferrite pieces 91A1.

According to the power receiving device 4A shown in FIG. 28, the amount of magnetic flux directed to side portions 89A of the power receiving coil 8A can be reduced, and the amount of magnetic flux directed to the power transmission coil 12A can be increased.

Therefore, in the power receiving device 4A and the power transmission device 3A according to the second embodiment, the coupling coefficient can be improved. Further, since the plurality of notch portions 42A, 92A are defined, the manufacturing cost can be reduced.

Figure 29:
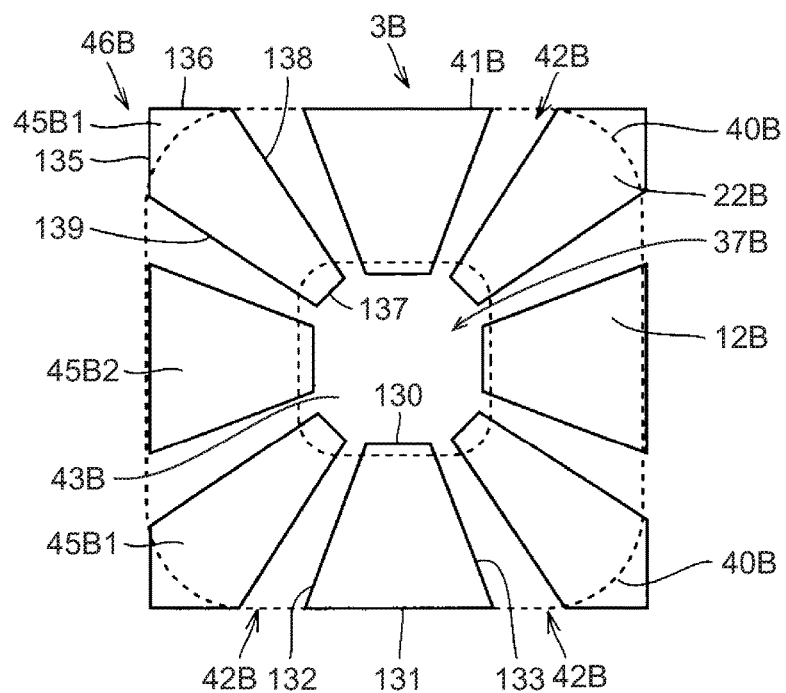
FIG. 29 is a plan view showing a power transmission coil 12B and a ferrite 22B of an electric power transmission device 3B according to a third embodiment.

FIG. 29 is a plan view showing a power transmission coil 12B and a ferrite 22B of an electric power transmission device 3B according to a third embodiment. As shown in FIG. 29, the power transmission device 3B includes the power transmission coil 12B and the ferrite 22B.

The ferrite 22B includes corner portions 46B, and a plurality of notch portions 42B are provided in portions of an outer peripheral portion of the ferrite 22b, which portions are located between the corner portions 46B.

The ferrite 22B includes ferrite pieces 45B1 that form the corner portions 46B, and ferrite pieces 45B2 disposed between adjacent ones of the ferrite pieces 45B1.

Each of the corner portions 46B is formed from one of the ferrite pieces 45B1, and no gap portions passing the corner portions 46B are defined, unlike the electric power transmission device according to the above-described first embodiment.

Each of the ferrite pieces 45B2 is formed in trapezoidal shape, and an outer periphery of the ferrite piece 45B2 includes a radially inner side 130, a radially outer side 131, a lateral side 132, and a lateral side 133.

The radially inner side 130 forms a part of the periphery of a hole portion 43B, and the radially outer side 131 forms a part of the outer periphery of the ferrite 22B. The length of the radially inner side 130 is smaller than that of the radially outer side 131.

The lateral side 132 is formed such that the winding axis O1 is located on an extended line of the lateral side 132, and the lateral side 133 is formed such that the winding axis O1 is located on an extended line of the lateral side 133.

An outer periphery of each of the ferrite pieces 45B1 includes outer sides 135, 136 that form a corresponding one of the corner portions 46B, a short side 137 that forms a part of the periphery of the hole portion 43B, and lateral sides 138, 139.

The lateral sides 138, 139 are formed such that the winding axis O1 is located on extended lines of the lateral sides 138, 139.

Figure 30:
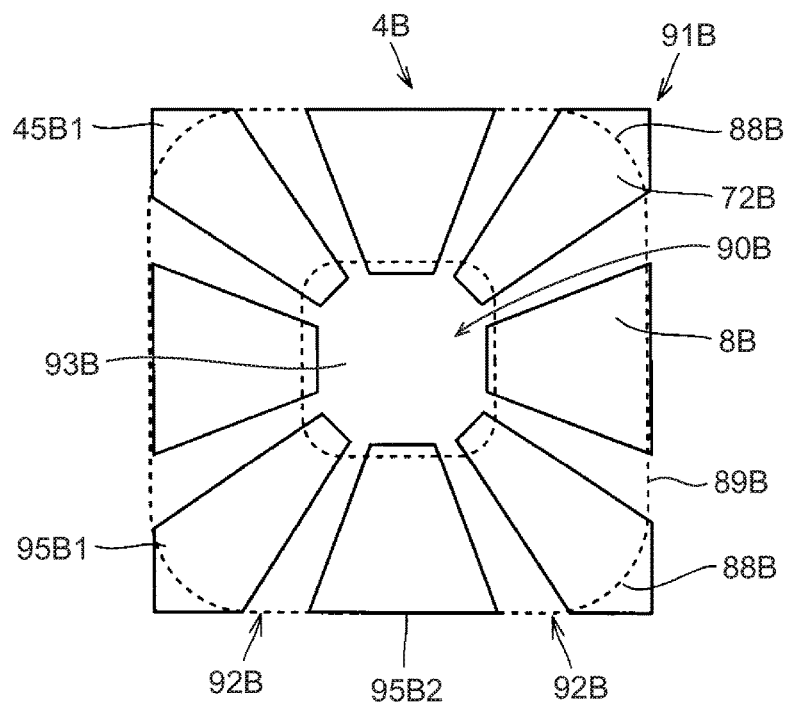
FIG. 30 is a plan view showing a power receiving coil 8B and a ferrite 72B of an electric power receiving device 4B according to the third embodiment.

FIG. 30 is a plan view showing a power receiving coil 8B and a ferrite 72B of an electric power receiving device 4B according to the third embodiment. As shown in FIG. 30, the ferrite 72B of the power receiving device 4B is formed similarly to the ferrite 22B of the power transmission device 3B.

More specifically, the ferrite 72B includes a plurality of corner portions 91B. A plurality of notch portions 92B are provided between adjacent ones of the corner portions 91B, in an outer peripheral portion of the ferrite 72B.

The ferrite 72B includes ferrite pieces 95B1 that form the corner portions 91B, and ferrite pieces 95B2 disposed between adjacent ones of the ferrite pieces 95B1. Each of the corner portions 91B is formed by one of the ferrite pieces 95B1, and no gap portions that pass the corner portions are defined, unlike the power receiving device 4 according to the first embodiment.

In the power transmission device 3B and the power receiving device 4B constructed as described above, no gap portions that pass the respective corner portions 46B, 91B are defined in the ferrites 22B, 72B. Therefore, the amount of magnetic flux traveling along magnetic paths that extend through the winding axes O1, O2 and the corner portions 46B, 91B can be increased. As a result, the magnetic flux interlinked with both the power transmission coil 12B and the power receiving coil 8B can be increased, and the coupling coefficient can be improved.

Figure 31:
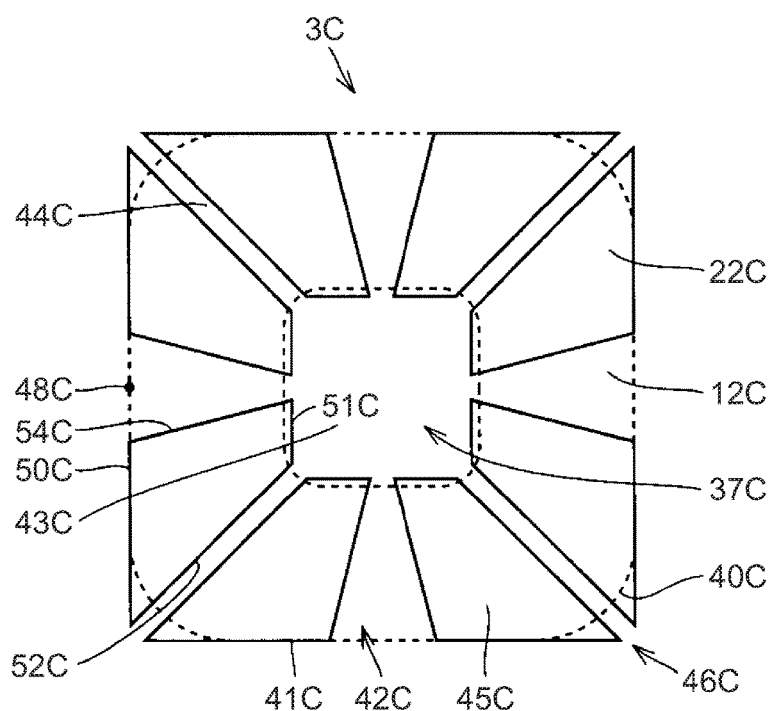
FIG. 31 is a plan view showing a power transmission coil 12C and a ferrite 22C of an electric power transmission device 3C according to a fourth embodiment.

FIG. 31 is a plan view showing a power transmission coil 12C and a ferrite 22C of an electric power transmission device 3C according to a fourth embodiment. As shown in FIG. 31, the ferrite 22C includes a plurality of corner portions 46C, and one notch portion 42C is provided in a portion located between the corner portions 46C, in an outer peripheral portion of the ferrite 22C. The notch portion 42C is provided at a position that overlaps a middle portion 48C of a corresponding side portion 41C of the power transmission coil 12C.

A hole portion 43C is defined in a central portion of the ferrite 22C, and the periphery of the hole portion 43C is formed so as to extend along the periphery of a hollow portion 37C of the power transmission coil 12C. In the ferrite 22C, a first gap portion 44C that extends from the hole portion 43C to each of the corner portions 46C is defined.

The ferrite 22C includes a plurality of ferrite pieces 45C arranged at intervals in the circumferential direction of the power transmission coil 12C.

An outer periphery of each of the ferrite pieces 45C includes a radially outer side 50C, a radially inner side 51C, an oblique side 52C, and a notch side 54C.

The corner portion 46C is formed by a pair of ferrite pieces 45C that are positioned such that their oblique sides 52C are opposed to each other. The oblique sides 52C are positioned so as to be opposed to each other with a gap portion 44C interposed therebetween.

The radially inner side 51C forms a part of the periphery of the hole portion 43C, and the radially inner side 51C extends along the periphery of the hollow portion 37C.

The notch portion 42C is defined by the notch sides 54 of adjacent ones of the ferrite pieces 45C. Each notch side 54C is formed such that the winding axis O1 is located on an extended line of the notch side 54C.

In the power transmission device 3C constructed as described above, the notch portions 42C are provided in the ferrite 22C, and each ferrite piece 45C is formed in the same shape; therefore, the manufacturing cost of the power transmission device 3C can be reduced.

Further, the notch portions 42C are provided in the outer peripheral portion of the ferrite 22C. Therefore, the amount of magnetic flux flowing along magnetic paths that extend through the winding axis O1 and the corner portions 46C can be increased. Consequently, the coupling coefficient can be improved.

Figure 32:
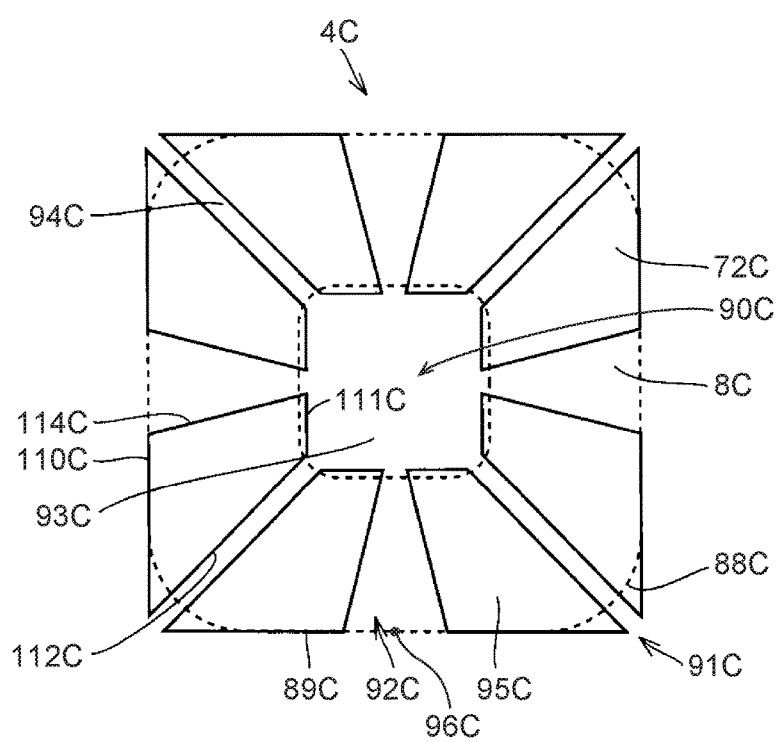
FIG. 32 is a plan view showing a ferrite 72C and a power receiving coil 8C of an electric power receiving device 4C according to the fourth embodiment.

FIG. 32 is a plan view showing a ferrite 72C and a power receiving coil 8C of an electric power receiving device 4C according to a fourth embodiment. As shown in FIG. 32, notch portions 92C are provided in middle portions between corner portions 91C, in an outer peripheral portion of the ferrite 72C, and a hole portion 93C is defined in a central portion of the ferrite 72C.

Each of the notch portions 92C is provided at a position that overlaps a middle portion 96C of a corresponding side portion 89C of the power receiving coil 8C. The periphery of the hole portion 93C extends along the periphery of a hollow portion 90C of the power receiving coil 8C. A first gap portion 94C that extends from the hole portion 93C toward each corner portion 91C is defined in the ferrite 72C.

The ferrite 72C includes a plurality of ferrite pieces 95C that are arranged at intervals in the circumferential direction of the power receiving coil 8C.

In the power receiving device 4C as described above, each ferrite piece 95C has the same shape, and the notch portions 92C are provided; therefore, the manufacturing cost is reduced.

Further, since the notch portions 92C are provided, the magnetic flux interlinked with the power transmission coil 12C can be increased.

Figure 33:
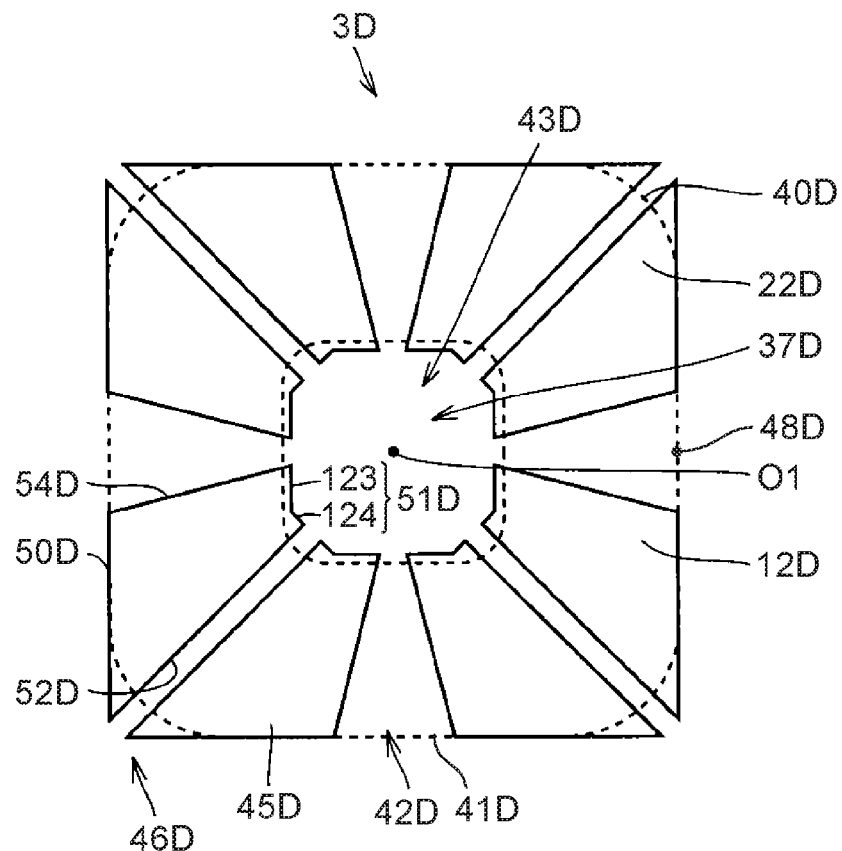
FIG. 33 is a plan view showing a modified example of the power transmission device 3C according to the fourth embodiment.

FIG. 33 is a plan view showing an electric power transmission device 3D as a modified example of the power transmission device 3C according to the fourth embodiment. The shape of a radially inner side 51D of each ferrite piece 45D of the power transmission device 3D shown in FIG. 33 is different from the shape of the radially inner side 51C of each ferrite piece 45C of the power transmission device 3C. The other configuration of the power transmission device 3D is identical with that of the power transmission device 3C.

Figure 34:
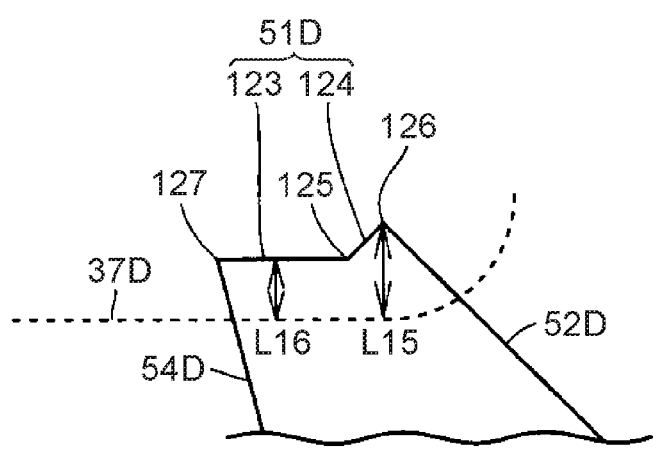
FIG. 34 is an enlarged view showing the configuration of a radially inner side 51C and its vicinity.

FIG. 34 is an enlarged view showing the radially inner side 51D and its surroundings. As shown in FIG. 34, the radially inner side 51D of the ferrite piece 45D includes a side portion 123 whose one end is connected to a notch side 54D, and a side portion 124 connected to the other end of the side portion 123 and one end of an oblique side 52D.

A corner portion 125 is formed by the side portion 123 and the side portion 124, and a corner portion 126 is formed by the side portion 124 and the oblique side 52D. Then, a corner portion 127 is formed by the notch side 54D and the side portion 123.

The side portion 123 extends along the periphery of a hollow portion 37D of a power transmission coil 12D. The side portion 124 is formed such that the distance between the side portion 124 and the periphery of the hollow portion 37D increases from the corner portion 125 to the corner portion 126.

In the radially inner side 51D, the corner portion 127 is closest to a central portion 48D of the power transmission coil 12D. In the radially inner side 51D, the corner portion 126 is closest to the corner portion 46D.

Where the distance between the corner portion 126 and the periphery of the hollow portion 37D is denoted as distance L15, and the distance between the corner portion 127 and the hollow portion 37D is denoted as distance L16, the distance L15 is larger than the distance L16.

The ferrite 22D will be compared with the ferrite 22C shown in FIG. 31. The radially inner side 51C of the ferrite 22C extends along the periphery of the hollow portion 37C, whereas the radially inner side 51D of the ferrite 22D is formed with the side portion 124.

Thus, the corner portion 126 of the ferrite 22D and a portion located in the vicinity of the corner portion 126 are closer to the winding axis O1 than those of the ferrite 22C. Therefore, the area over which the ferrite 22D is exposed through the hollow portion 37D is larger than the area over which the ferrite 22C is exposed through the hollow portion 37C. As a result, the amount of magnetic flux directed from the winding axis O1 side to the corner portion 46D can be increased, and the magnetic flux interlinked with the power receiving coil can be increased.

Figure 35:
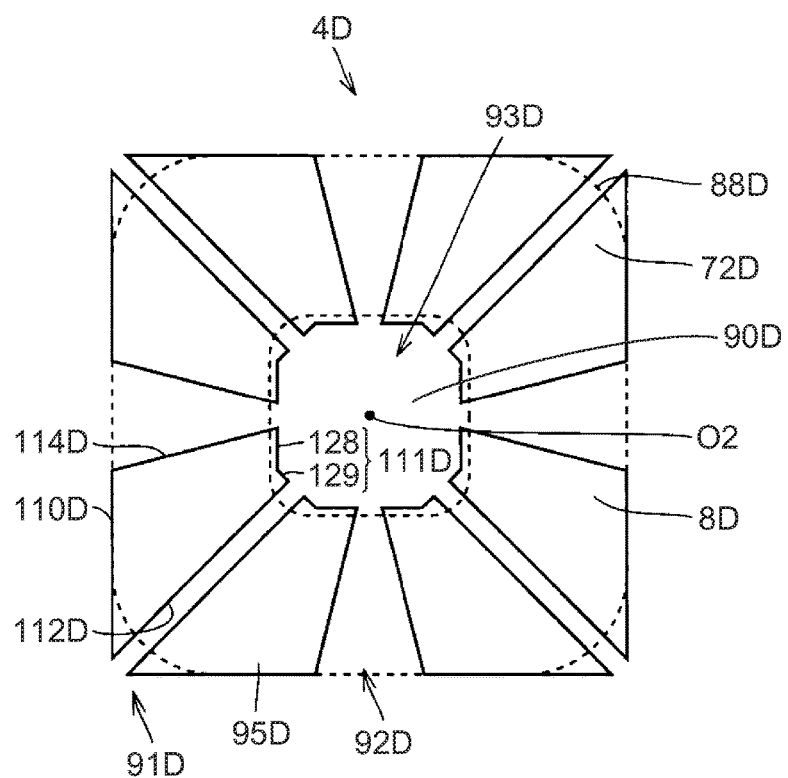
FIG. 35 is a plan view showing a modified example of the power receiving device 4C shown in FIG. 32.

FIG. 35 is a plan view showing a modified example of the power receiving device 4C shown in FIG. 32. As shown in FIG. 35, a power receiving device 4D includes a ferrite 72D and a power receiving coil 8D, and the ferrite 72D includes a plurality of ferrite pieces 95D.

An outer periphery of each of the ferrite pieces 95D includes a radially outer side 110D, a radially inner side 111D, an oblique side 112D, and a notch side 114D. The radially inner side 111D includes a side portion 128 and a side portion 129. The side portion 128 extends along the periphery of a hollow portion 90D of the power receiving coil 8D. The side portion 129 is formed such that the distance between the side portion 129 and the periphery of the hollow portion 90D increases from a connecting portion between the side portion 129 and the side portion 128.

Therefore, in the power receiving device 4D, too, the amount of magnetic flux interlinked with a power transmission coil 12D can be increased, as in the power transmission device 3D.

In the first embodiment, for example, a plurality of first gap portions 44a and a plurality of second gap portions 44b are defined in the ferrite 22, as shown in FIG. 6. However, the first air gap portions 44a and second gap portions 44b are not an essential arrangement.

Figure 36:
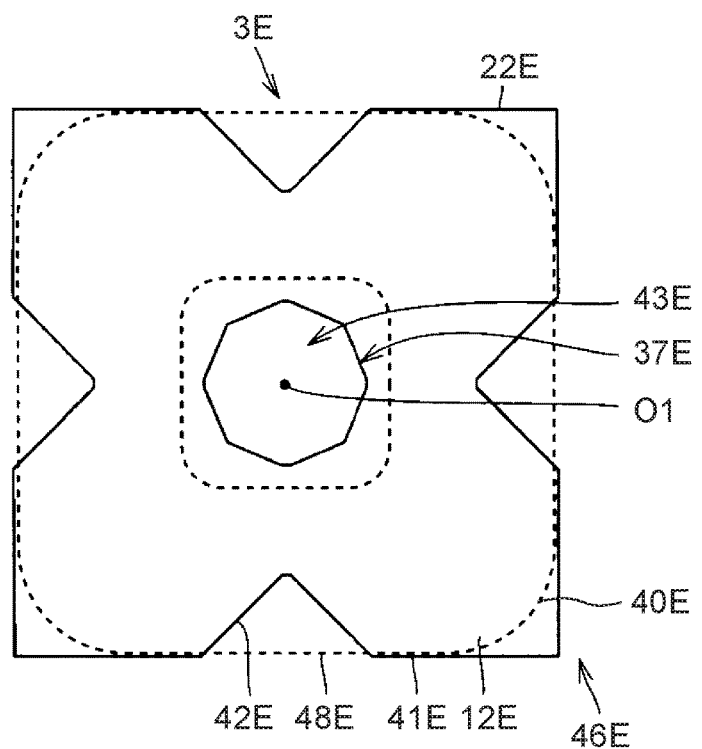
FIG. 36 is a plan view showing a ferrite 22E and a power transmission coil 12E of an electric power transmission device 3E.

FIG. 36 is a plan view showing a ferrite 22E and a power transmission coil 12E of an electric power transmission device 3E. As shown in FIG. 36, the first gap portions 44a and the second gap portions 44b are not defined in the ferrite 22E.

Since the first gap portion 44a is not defined in each corner portion 46E, the area of the corner portion 46E is larger than the area of the corner portion 46 shown in FIG. 6.

Therefore, the amount of magnetic flux directed from the winding axis O1 toward the corner portion 46E can be increased, and the amount of magnetic flux interlinked with the power receiving coil can be increased.

Also, while the magnetic flux MF incident on the corner portion 46E returns to the vicinity of the winding axis O1, the flow of the magnetic flux MF is not impeded by the second gap portions 44b. Therefore, after entering the corner portion 46E, the magnetic flux MF can return to the winding axis O1 and its vicinity, through various paths. As a result, the magnetic resistance can be reduced in the ferrite 22E.

The ferrite of the power receiving device 4 can be formed similarly to the ferrite 22E.

Figure 37:
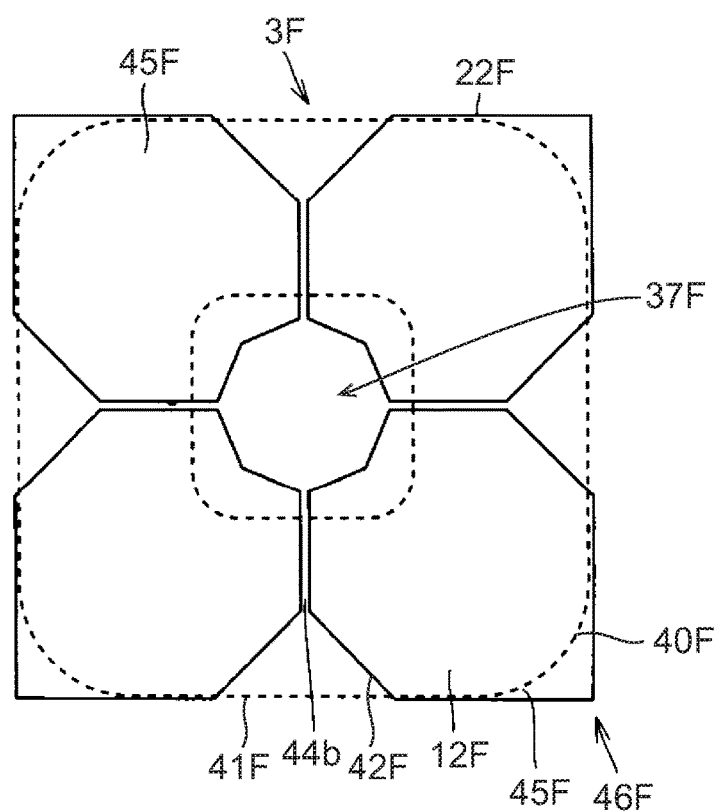
FIG. 37 is a plan view showing an electric power transmission device 3F.

FIG. 37 shows an electric power transmission device 3F as a modified example of the electric power transmission device 3E shown in FIG. 36. In a ferrite 22F of the power transmission device 3F, the second gap portions 44b are defined, but the first gap portions 44a are not defined.

The ferrite 22F includes four ferrite pieces 45F arranged in the circumferential direction of a power transmission coil 12F. The second gap portions 44b are defined between adjacent ones of the ferrite pieces 45F.

Thus, the ferrite 22F consists of a plurality of ferrite pieces 45F, thus allowing the power transmission device 3F to be large-sized. Further, since the first gap portions 44a are not defined, the magnetic flux interlinked with the power receiving coil can be increased.

Figure 38:
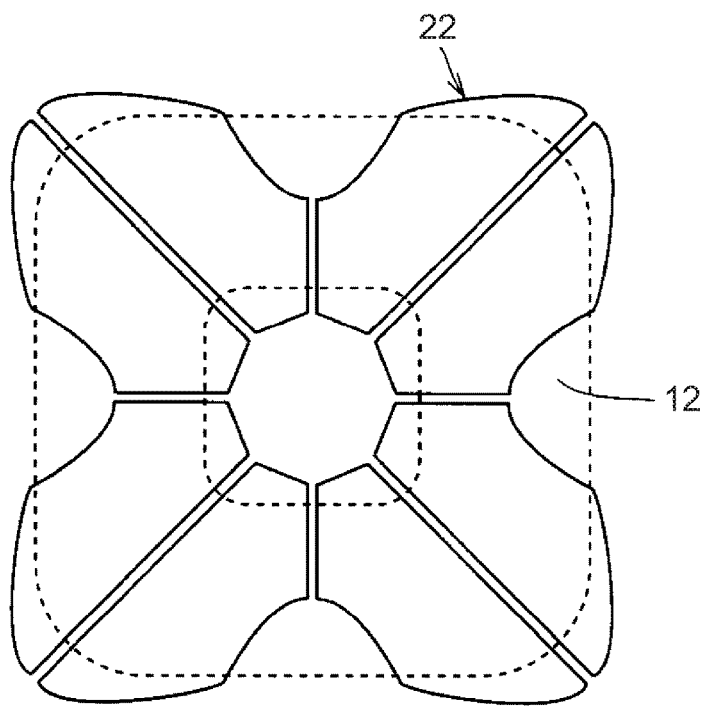
FIG. 38 is a plan view showing a modified example of a ferrite.

While the outer periphery of the ferrite 22 consists of straight side portions in the first through fifth embodiments, the outer periphery of the ferrite 22 may be formed in curved shape or arcuate shape, as shown in FIG. 38. Similarly, the outer periphery of the ferrite 72 of the power receiving device 4 may be formed in curved shape or arcuate shape.

Figure 39:
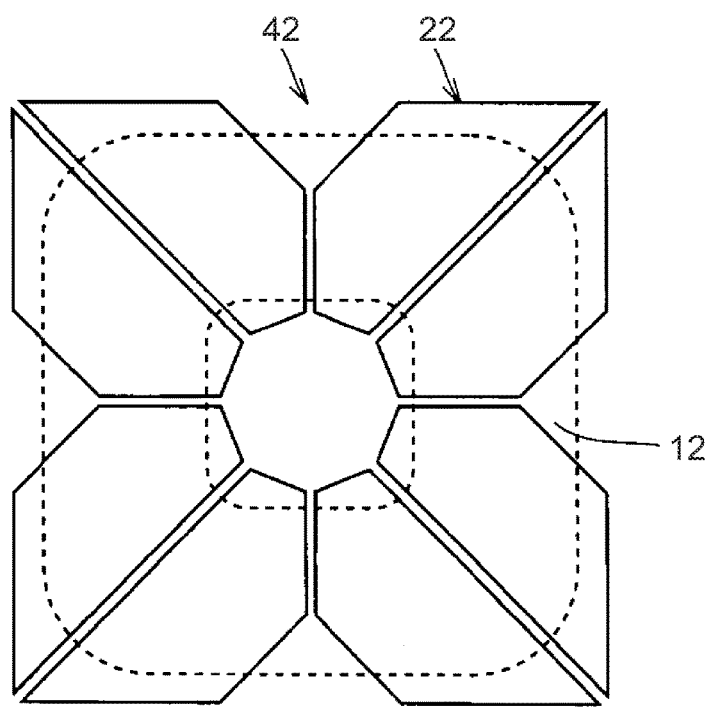
FIG. 39 is a plan view showing a modified example of a ferrite.

While the side portions of the ferrite are aligned with the side portions of the power transmission coil or power receiving coil in the first through fifth embodiments, the ferrite 22 may be formed to be larger in size than the power transmission coil 12, as shown in FIG. 39. In this case, too, when the power transmission coil 12 and the ferrite 22 are viewed from above the power transmission coil 12 and the ferrite 22, a part of each notch portion 42 overlaps the power transmission coil 12. In the first embodiment and other embodiments, the side portions of the ferrite are formed so as to overlap the side portions of the power transmission coil or power receiving coil in the vertical direction, so that the power transmission device 3 and the power receiving device 4 are reduced in size. Further, the support plate that supports the ferrite is formed with the stepped portion 16, as shown in FIG. 9, so that magnetic flux can enter the side portions of the ferrite.

In the first through fifth embodiments, the notch portions provided in the ferrite are sized so that the notch portions overlap parts of side portions of the outer peripheries of the power receiving coil and power transmission coil. However, various sizes may be employed as the size of the notch portions.

Figure 40:
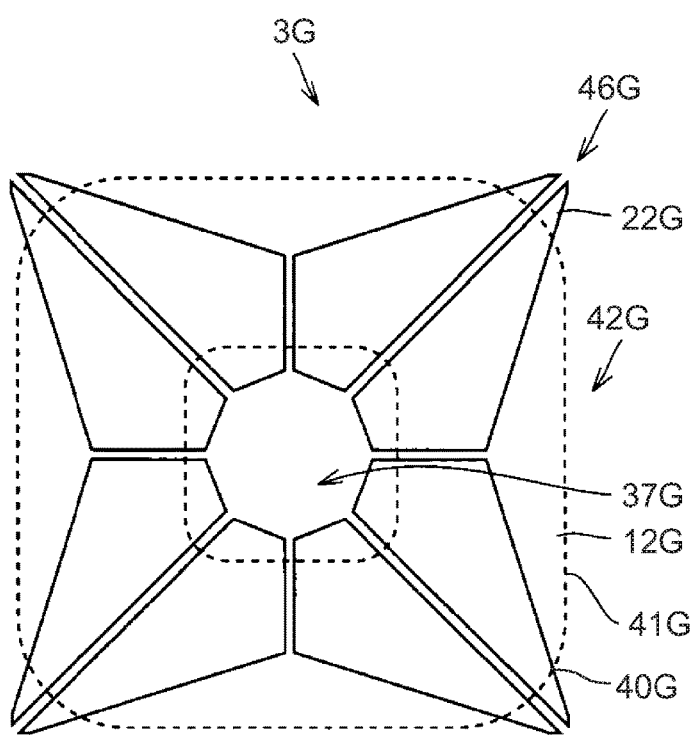
FIG. 40 is a plan view showing a modified example of electric power transmission device.

FIG. 40 is a plan view showing a modified example of the electric power transmission device. As shown in FIG. 40, an electric power transmission device 3G includes a ferrite 22G and a power transmission coil 12G displaced on an upper surface of the ferrite 22G.

The ferrite 22G includes a plurality of corner portions 46Q and an outer peripheral portion of the ferrite 22G includes notch portions 42G provided between the corner portions 46G. As shown in FIG. 40, when the notch portions 42G and the power transmission coil 12G are viewed from above the power transmission coil 12G and the ferrite 22Q the notch portions 42G are located, over the enter length of the side portions 41G of the power transmission coil 12G.

The notch portions 42G are formed such that the width of each notch portion 42G is reduced toward a hollow portion 37G of the power transmission coil 12G. Therefore, the width of a flow channel through which magnetic flux incident upon each corner portion 46G flows increases, from a distal end portion of the corner portion 46G toward the hollow portion 37Q and the magnetic flux can flow favorably.

While each of the power transmission coil and the power receiving coil is in the form of a single spiral type coil, in the above-described embodiments, each of the power transmission coil and the power receiving coil may consist of two or more spiral coils.

Figure 41:
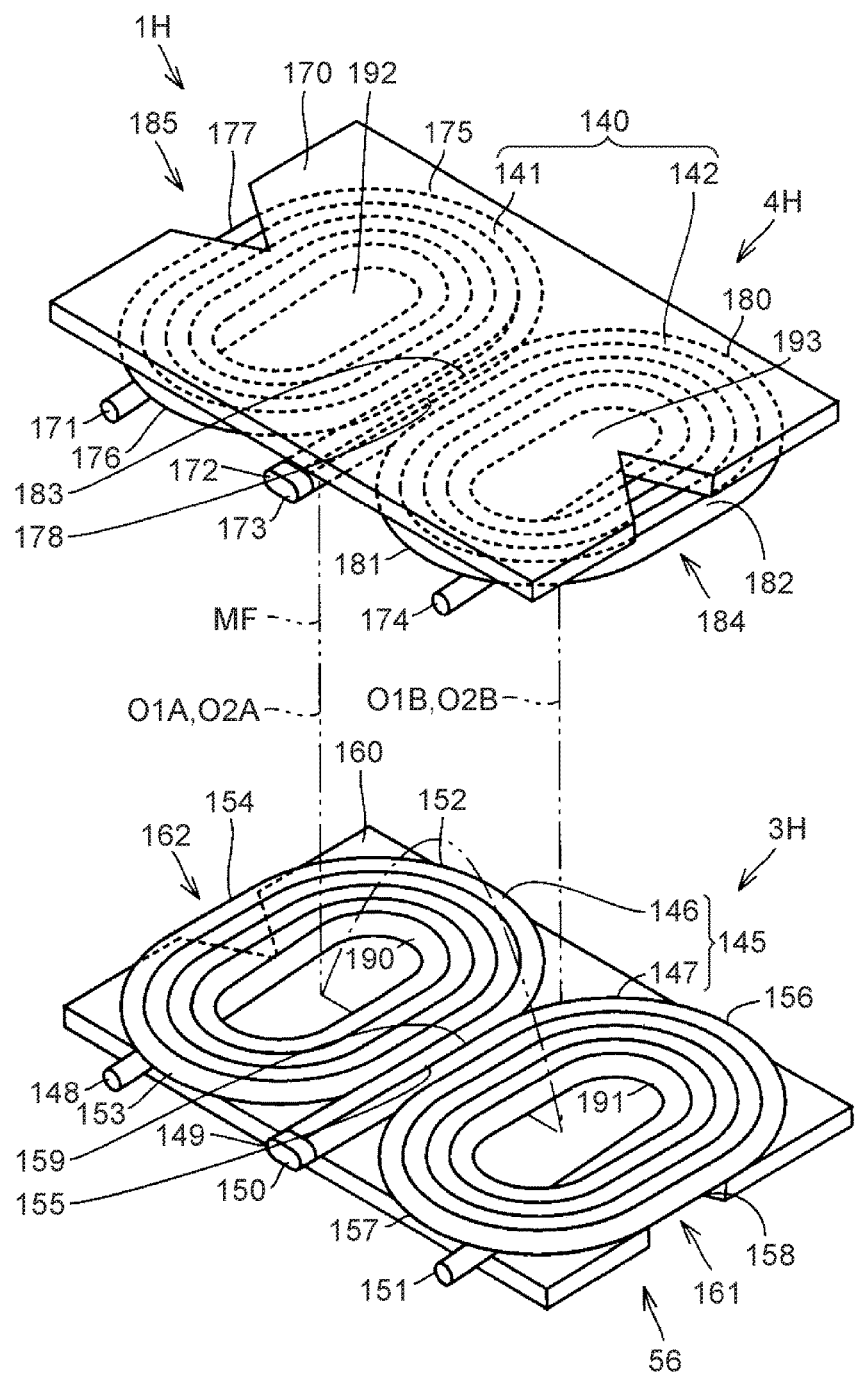
FIG. 41 is a perspective view schematically showing a modified example of the contactless charging system 1.

FIG. 41 is a perspective view schematically showing a contactless charging system 1H as a modified example of the contactless charging system 1. The contactless charging system 1H shown in FIG. 41 includes an electric power transmission device 3H and an electric power receiving device 4H.

The power transmission device 3H includes a ferrite 160 in the form of a plate, and a power transmission coil unit 145 disposed on an upper surface of the ferrite 160.

The power transmission coil unit 145 includes a power transmission coil 146, and a power transmission coil 147 connected to the power transmission coil 146. A hollow portion 190 is defined in a central portion of the power transmission coil 146, and a hollow portion 191 is also defined in a central portion of the power transmission coil 147.

The power transmission coil 146 includes an inner end 148 and an outer end 149, and surrounds a winding axis O1A. Further, the power transmission coil 146 is formed such that the distance from the winding axis O1A increases as the number of turns increases from the inner end 148 to the outer end 149.

The power transmission coil 147 includes an outer end 150 and an inner end 151, and the outer end 150 is connected to the outer end 149. The power transmission coil 147 is formed so as to surround a winding axis O1B, such that the distance from the winding axis O1B is reduced as the number of turns increases from the outer end 150 to the inner end 151.

The direction of winding from the inner end 148 toward the outer end 149 in the power transmission coil 146 is opposite to the direction of winding from the outer end 150 toward the inner end 151 in the power transmission coil 147.

An outer periphery of the power transmission coil 146 includes a pair of bent portions 152, 153, and a pair of side portions 154, 155. An outer periphery of the power transmission coil 147 also includes a pair of bent portions 156, 157, and a pair of side portions 158, 159. Notch portions 161, 162 are located at portions overlapping the side portions 158, 159, in an outer peripheral portion of the ferrite 160.

The power receiving device 4H includes a ferrite 170, and a power receiving coil unit 140 disposed on a lower surface of the ferrite 170.

The power receiving coil unit 140 includes a power receiving coil 141 and a power receiving coil 142. A hollow portion 192 is defined in a central portion of the power receiving coil 141, and a hollow portion 193 is defined in a central portion of the power receiving coil 142. The power receiving coil 141 includes an inner end 171 and an outer end 172, and is formed so as to surround a winding axis O2A. The power receiving coil 142 includes an outer end 173 and an inner end 174, and is formed so as to surround a winding axis O2B. The outer end 172 of the power receiving coil 141 is connected with the outer end 173 of the power receiving coil 142.

The direction of winding of the power receiving coil 141 from the outer end 172 to the inner end 171 is opposite to the direction of winding of the power receiving coil 142 from the outer end 173 to the inner end 174.

An outer periphery of the power receiving coil 141 includes a pair of bent portions 175, 176, and a pair of side portions 177, 178. An outer periphery of the power receiving coil 142 also includes a pair of bent portions 180, 181, and a pair of side portions 182, 183.

In an outer peripheral portion of the ferrite 170, notch portions 184, 185 are formed so as to overlap the side portions 182, 177.

In the contactless charging system 1H constructed as described above, when electric power is transmitted from the power transmission device 3H to the power receiving device 4H, AC current is supplied to the power transmission coil unit 145.

The direction of winding of the power transmission coil 146 is opposite to that of the power transmission coil 147, and the direction of winding of the power receiving coil 141 is opposite to that of the power receiving coil 142.

Therefore, the magnetic flux MF emitted from the hollow portion 190 of the power transmission coil 146 passes through the hollow portion 192 of the power receiving coil 141, and enters the ferrite 170. Then, the magnetic flux MF is emitted from the hollow portion 193 of the power receiving coil 142, and enters the hollow portion 191 of the power transmission coil 147. Then, the magnetic flux MF enters the ferrite 160. With the magnetic flux MF flowing in this manner, the power receiving coil unit 140 receives electric power.

At this time, a part of the magnetic flux is apt to flow around the side portion 154 to be self-closed, or flow around the side portion 158 to be self-closed.

In the meantime, the ferrite 160 is provided with the notch portions 161, 162, so that the amount of magnetic flux that flows around to be self-closed as described above is reduced.

As a result, the amount of magnetic flux that travels along magnetic paths that extend through the hollow portion 190 and the hollow portion 191 is increased. With the amount of magnetic flux flowing along these magnetic paths thus increased, the magnetic flux MF that passes positions apart from the power transmission coil unit 145 and enters the hollow portion 191 is increased.

As the magnetic flux travels away from the power transmission coil unit 145, it becomes closer to the power receiving coil unit 140. As a result, the magnetic flux that is emitted from the hollow portion 190 and enters the hollow portion 192 of the power receiving coil 141 increases, and the coupling coefficient is improved.

Thus, this invention can be applied to various types of coils. While the outline of the ferrite and the coil has a generally square shape in the above-described first through fifth embodiments, the disclosure may be applied to ferrites and coils having polygonal shapes, such as a rectangular shape, pentagonal shape, and hexagonal shape.

The coupling coefficients of power transmission devices and power receiving devices according to some examples, and the coupling coefficients of power transmission devices and power receiving devices according to some comparative examples will be described.

Figure 42:
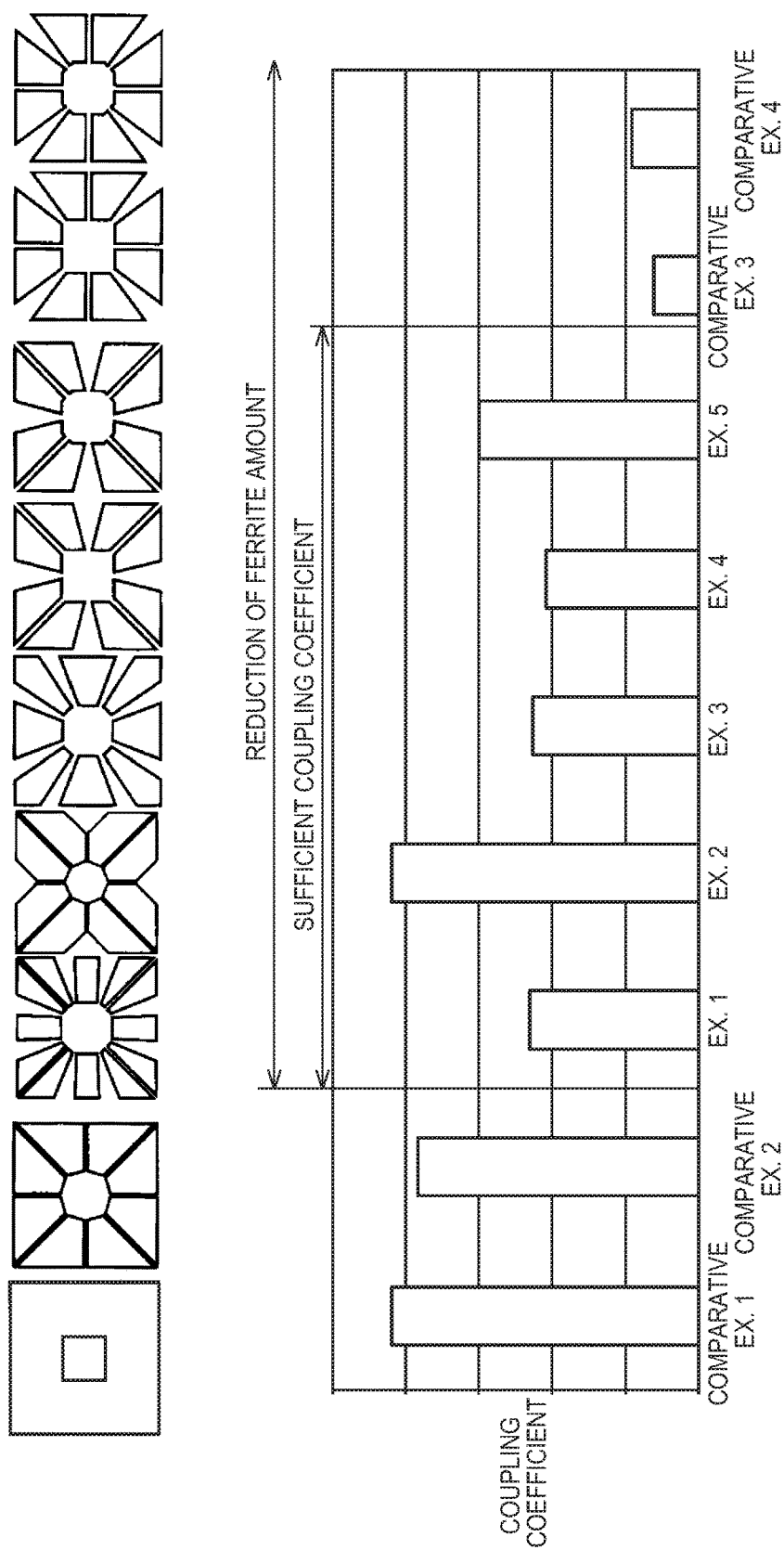
FIG. 42 is a graph indicating coupling coefficients of Examples 1-5 and Comparative Examples 1-4.

FIG. 42 is a graph showing the coupling coefficients of Examples 1-5 and the coupling coefficients of Comparative Examples 1-4. This graph indicates simulation results, which are obtained using JMAG (registered trademark), as electromagnetic field analysis software.

An electric power transmission device of Example 1 is the electric power transmission device 3A shown in FIG. 27, and an electric power receiving device of Example 1 is the electric power receiving device 4A shown in FIG. 28.

An electric power transmission device of Example 2 is the electric power transmission device 3 shown in FIG. 6, and an electric power receiving device of Example 2 is the electric power receiving device 4 shown in FIG. 16.

An electric power transmission device of Example 3 is the electric power transmission device 3B shown in FIG. 29, and an electric power receiving device of Example 3 is the electric power receiving device 4B shown in FIG. 30.

An electric power transmission device of Example 4 is the electric power transmission device 3C shown in FIG. 31, and an electric power receiving device of Example 4 is the electric power receiving device 4C shown in FIG. 32.

An electric power transmission device of Example 5 is the electric power transmission device 3D shown in FIG. 33, and an electric power receiving device of Example 5 is the electric power receiving device 4D shown in FIG. 35.

Figure 43:
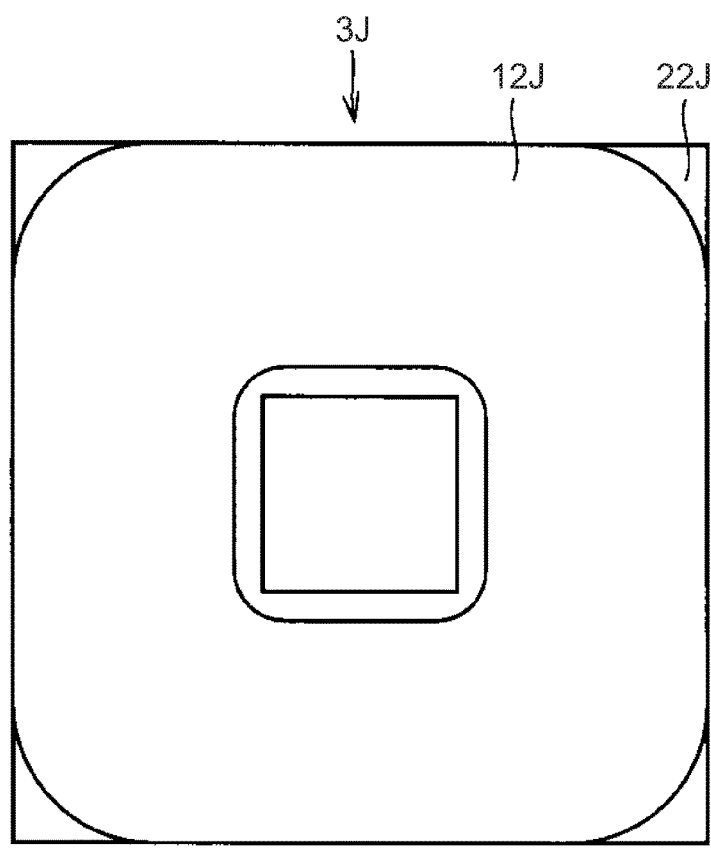
FIG. 43 is a plan view showing a ferrite 22J and a power transmission coil 12J of an electric power transmission device 3J according to Comparative Example 1.

Next, each of Comparative Examples 1-4 will be described. FIG. 43 is a plan view showing a ferrite 22J and a power transmission coil 12J of an electric power transmission device 3J according to Comparative Example 1. The ferrite 22J is not provided with any notch portions and gap portions. An electric power receiving device according to Comparative Example 1 has the same configuration as the power transmission device 3J.

Figure 44:
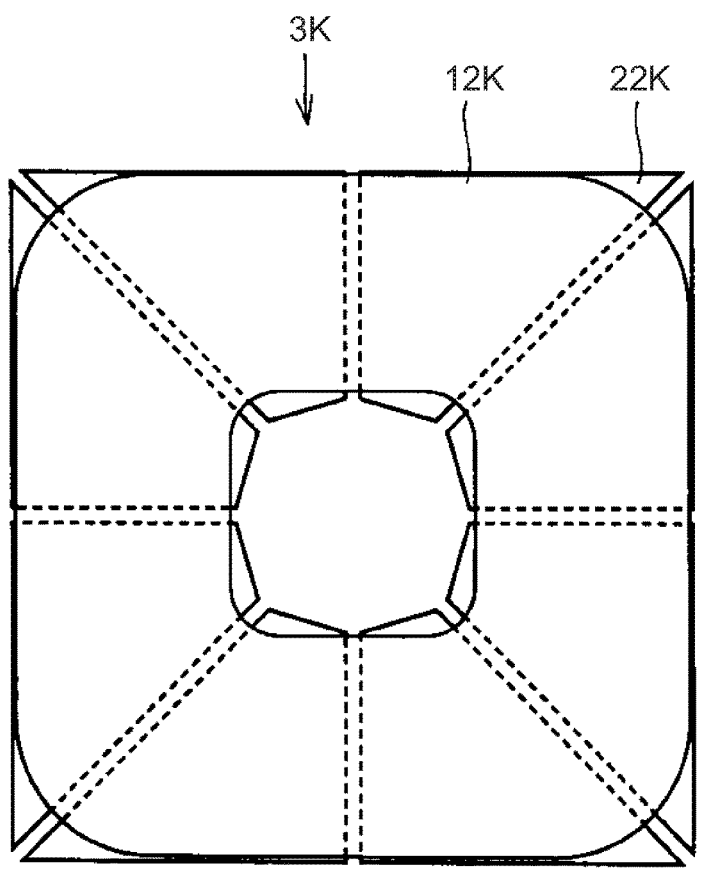
FIG. 44 is a plan view showing a ferrite 22K and a power transmission coil 12K of an electric power transmission device 3K according to Comparative Example 2.

FIG. 44 is a plan view showing a ferrite 22K and a power transmission coil 12K of an electric power transmission device 3K according to Comparative Example 2. The first gap portions 44a and second gap portions 44b are defined in the ferrite 22K, but no notch portions are provided. An electric power receiving device according to Comparative Example 2 has the same configuration as the power transmission device 3K.

Figure 45:
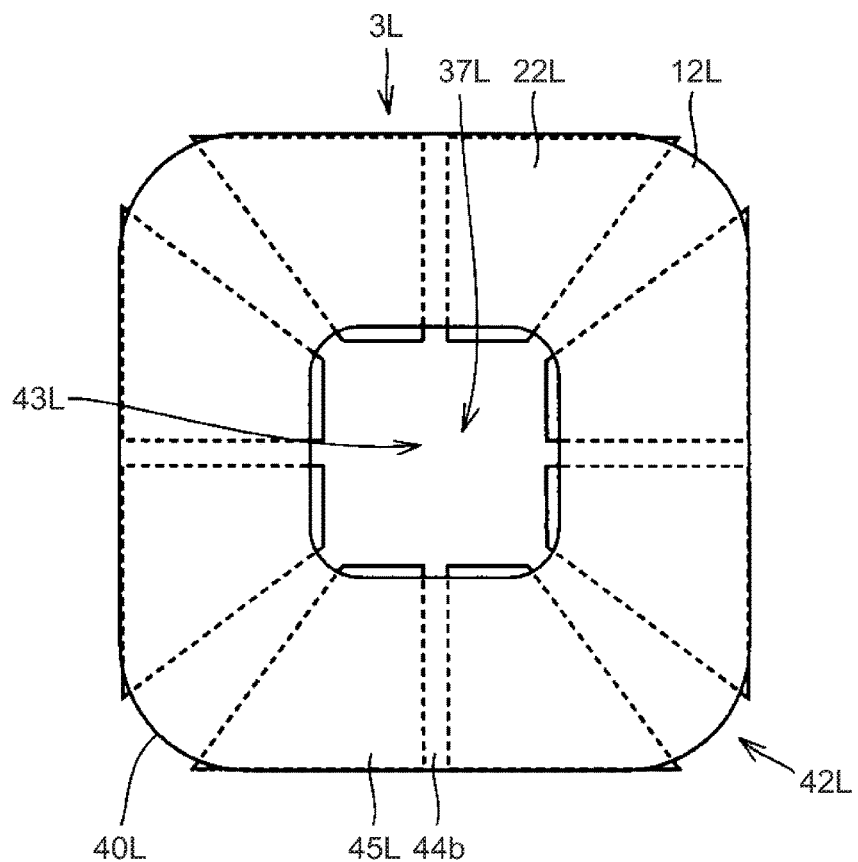
FIG. 45 is a plan view showing an electric power transmission device 3L according to Comparative Example 3.

FIG. 45 is a plan view showing an electric power transmission device 3L according to Comparative Example 3. The power transmission device 3L includes a power transmission coil 12L and a ferrite 22L. The ferrite 22L includes a plurality of ferrite pieces 45L.

The ferrite 22L is provided with second gap portions 44b and notch portions 42L. The notch portions 42L are located at positions overlapping bent portions 40L of the power transmission coil 12L. The notch portions 42L extend from a hole portion 43L and reach an outer periphery of the ferrite 22L.

The hole portion 43L is defined in a central portion of the ferrite 22L, and the periphery of the hole portion 43L is formed so as to extend along a hollow portion 37L of the power transmission coil 12. An electric power receiving device according to Comparative Example 3 has the same configuration as the power transmission device 3L.

Figure 46:
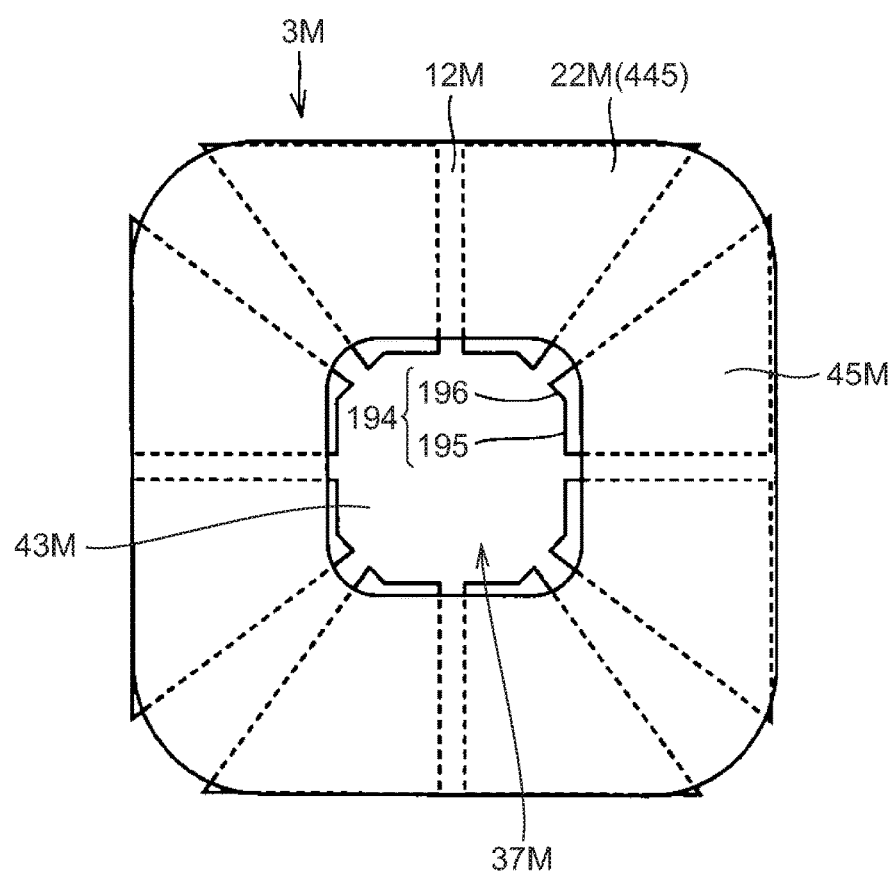
FIG. 46 is a plan view showing an electric power transmission device 3M according to Comparative Example 4.

FIG. 46 is a plan view showing an electric power transmission device 3M according to Comparative Example 4. A ferrite 22M of the power transmission device 3M includes a plurality of ferrite pieces 45M. A radially inner side 194 of each of the ferrite pieces 45M forms a part of the periphery of a hole portion 43M of the ferrite 22M.

The radially inner side 194 includes a side portion 195, and a side portion 196 connected to the side portion 195. The side portion 195 extends along a hollow portion 37M of a power transmission coil. The side portion 196 is inclined, such that the distance from the periphery of the hollow portion 37M increases from a connecting portion of the side portion 195 and the side portion 196, toward the other end of the side portion 196.

The configuration of the power transmission device 3M is identical with that of the power transmission device 3L shown in FIG. 45, except for the radially inner sides 194. An electric power receiving device according to Comparative Example 4 has the same configuration as the power transmission device 3M.

In the power transmission devices 3J, 3K according to Comparative Example 1 and Comparative Example 2, no notch portions are provided in the ferrites 22J, 22K, and the manufacturing cost is higher than those of the power transmission devices according to Examples 1-5.

The coupling coefficients between the power transmission devices 3L, 3M and the power receiving devices according to Comparative Example 3 and Comparative Example 4 are lower than those of Examples 1-5.

In Comparative Example 3 and Comparative Example 4, the notch portions are located at corner portions of the ferrite, and the magnetic resistance of magnetic paths along which magnetic flux interlinked with both the power transmission coil and the power receiving coil travels is high. On the other hand, in Examples 1-5, no notch portions are provided at corner portions of the ferrite, but notch portions are provided at portions overlapping side portions of the power transmission coil. Therefore, high coupling coefficients are ensured.

It is understood from FIG. 42 that the coupling coefficient of Example 2 is higher than those of Example 1 and Example 3. In Embodiment 2, the notch portions are provided so as to overlap middle portions of side portions of the coil. On the other hand, in Example 1 and Example 3, the notch portions are provided so as to overlap portions located on the opposite sides of middle portions of side portions of the coil. Thus, in Example 2, the notch portions are located at portions overlapping the middle portions of the side portions of the coil, and a further improved coupling coefficient can be ensured.

It is understood from FIG. 42 that, in Examples 4, 5, the coupling coefficient of Example 5 is higher than that of Example 4. This is because the ferrite is formed such that the corner portion 126 is located closer to the winding axis O1 than the corner portion 125, as shown in FIG. 34. It is also understood through comparison between Comparative Example 3 and Comparative Example 4 that the coupling coefficient can be improved by employing the above-described arrangement. Further, in Example 2, too, the above arrangement is employed, and the coupling coefficient is increased.

Thus, it will be understood that the manufacturing cost can be reduced, and a sufficiently high coupling coefficient can be ensured, by locating notch portions at positions overlapping side portions of the power transmission coil.

While the respective embodiments have been described based on the disclosure, each of the embodiments disclosed herein is not restrictive but exemplary in all respects.

The disclosure can be applied to electric power transmission devices and electric power receiving devices.

What is claimed is:

1. An electric power receiving device comprising:
    a ferrite including a first major surface and a second major surface arranged in a thickness direction, the ferrite being in a form of a plate; and
    a power receiving coil disposed on the first major surface, wherein the power receiving coil surrounds a winding axis that extends in the thickness direction,
    the power receiving coil has a hollow portion when the power receiving coil is viewed from an observation position spaced apart from the power receiving coil in a direction in which the winding axis extends,
    an outer peripheral portion of the power receiving coil includes a plurality of bent portions, and side portions that connect adjacent ones of the bent portions,
    the ferrite includes corner portions that protrude outwardly of the bent portions of the power receiving coil, when the ferrite is viewed from the observation position,
    notch portions are provided in an outer peripheral portion of the ferrite such that the notch portions overlap the side portions, respectively, when the power receiving coil and the ferrite are viewed from the observation position, and
    a width of each of the notch portions as measured in a circumferential direction of the power receiving coil increases in a direction away from the hollow portion of the power receiving coil.

2. The electric power receiving device according to claim 1, wherein
    each of the notch portions overlaps a middle part of a corresponding one of the side portions of the power receiving coil, when the ferrite and the power receiving coil are viewed from the observation position.

3. The electric power receiving device according to claim 2, wherein
    the ferrite has a hole portion,
    the hole portion of the ferrite is located within the hollow portion of the power receiving coil, when the ferrite and the power receiving coil are viewed from the observation position,
    a periphery of the hole portion includes a first portion close to the middle part, and a second portion close to the corner portion, and
    a distance between a periphery of the hollow portion and the second portion is larger than a distance between the periphery of the hollow portion and the first portion.

4. The electric power receiving device according to claim 3, wherein
    the ferrite has a first gap portion that extends from the hole portion and reaches each of the corner portions, and a second gap portion that extends from the hole portion and reaches each of the notch portions,
    the ferrite includes a plurality of ferrite pieces that are arranged at intervals in a circumferential direction of the power receiving coil,
    each of the ferrite pieces includes a radially outer side, a radially inner side, an oblique side, a notch side, and a short side, the radially outer side is located in an outer peripheral portion of the corner portion, the radially inner side forms a part of the periphery of the hole portion, the oblique side connects the radially outer side and the radially inner side;

the notch side is connected to the radially outer side, and forms a part of a periphery of the notch portion, the short side connects the radially inner side and the notch side, the outer peripheral portion of each of the corner portions is formed by the radially outer sides of two of the ferrite pieces that are arranged such that the oblique sides are opposed to each other with the first gap portion interposed between the radially outer sides of the two of the ferrite pieces, and the periphery of each of the notch portions is formed by the notch sides of two of the ferrite pieces that are arranged such that the short sides are opposed to each other with the second gap portion interposed between the notch sides of the two of the ferrite pieces.

5. An electric power transmission device comprising:

a ferrite including a first major surface and a second major surface arranged in a thickness direction, the ferrite being in a form of a plate; and a power transmission coil disposed on the first major surface, wherein the power transmission coil surrounds a winding axis that extends in the thickness direction, the power transmission coil has a hollow portion when the power transmission coil is viewed from an observation position spaced apart from the power transmission coil in a direction in which the winding axis extends, an outer peripheral portion of the power transmission coil includes a plurality of bent portions, and side portions that connect adjacent ones of the bent portions, the ferrite includes corner portions that protrude outwardly of the bent portions of the power transmission coil, when the ferrite is viewed from the observation position, notch portions are provided in an outer peripheral portion of the ferrite such that the notch portions overlap the side portions, respectively, when the power transmission coil and the ferrite are viewed from the observation position, and a width of each of the notch portions as measured in a circumferential direction of the power transmission coil increases in a direction away from the hollow portion of the power transmission coil.

6. The electric power transmission device according to claim 5, wherein each of the notch portions overlaps a middle part of a corresponding one of the side portions of the power transmission coil, when the ferrite and the power transmission coil are viewed from the observation position.

7. The electric power transmission device according to claim 6, wherein the ferrite has a hole portion, the hole portion of the ferrite is located within the hollow portion of the power transmission coil, when the ferrite and the power transmission coil are viewed from the observation position, a periphery of the hole portion includes a first portion close to the middle part, and a second portion close to the corner portion, and a distance between a periphery of the hollow portion and the second portion is larger than a distance between the periphery of the hollow portion and the first portion.

8. The electric power transmission device according to claim 7, wherein the ferrite has a first gap portion that extends from the hole portion and reaches each of the corner portions, and a second gap portion that extends from the hole portion and reaches each of the notch portions, the ferrite includes a plurality of ferrite pieces that are arranged at intervals in a circumferential direction of the power transmission coil, each of the ferrite pieces includes a radially outer side, a radially inner side, an oblique side, a notch side, and a short side, the radially outer side is located in an outer peripheral portion of the corner portion, the radially inner side forms a part of the periphery of the hole portion, the oblique side connects the radially outer side and the radially inner side;

the notch side is connected to the radially outer side, and forms a part of a periphery of the notch portion, the short side connects the radially inner side and the notch side, the outer peripheral portion of each of the corner portions is formed by the radially outer sides of two of the ferrite pieces that are arranged such that the oblique sides are opposed to each other with the first gap portion interposed between the radially outer sides of the two of the ferrite pieces, and the periphery of each of the notch portions is formed by the notch sides of two of the ferrite pieces that are arranged such that the short sides are opposed to each other with the second gap portion interposed between the notch sides of the two of the ferrite pieces.

* * * * *